(12) United States Patent
Li et al.

(10) Patent No.: US 11,997,649 B2
(45) Date of Patent: May 28, 2024

(54) AUTONOMOUS CO-CHANNEL OPERATIONS

(71) Applicant: QUALCOMM Incorporated, San Diego, CA (US)

(72) Inventors: Qing Li, Princeton Junction, NJ (US); Hong Cheng, Basking Ridge, NJ (US); Tien Viet Nguyen, Bridgewater, NJ (US); Sourjya Dutta, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/392,197

(22) Filed: Aug. 2, 2021

(65) Prior Publication Data

US 2023/0032174 A1   Feb. 2, 2023

(51) Int. Cl.
*H04W 16/14* (2009.01)
*H04W 72/02* (2009.01)
*H04W 72/0453* (2023.01)
*H04W 72/1263* (2023.01)
*H04W 72/542* (2023.01)
(Continued)

(52) U.S. Cl.
CPC ....... *H04W 72/02* (2013.01); *H04W 72/0453* (2013.01); *H04W 72/1263* (2013.01); *H04W 72/542* (2023.01); *H04W 24/10* (2013.01)

(58) Field of Classification Search
None
See application file for complete search history.

(56) References Cited

U.S. PATENT DOCUMENTS

| 10,791,558 B2 * | 9/2020 | Santhanam ....... H04W 28/0252 |
| 10,820,348 B2 * | 10/2020 | Khoryaev ........... H04W 72/541 |
| 11,337,126 B2 * | 5/2022 | Tseng ................... H04W 76/27 |

(Continued)

FOREIGN PATENT DOCUMENTS

| EP | 3713354 A1 | 9/2020 |
| WO | WO-2019158054 A1 | 8/2019 |

(Continued)

OTHER PUBLICATIONS

International Search Report and Written Opinion—PCT/US2022/037463—ISA/EPO—dated Oct. 21, 2022.

*Primary Examiner* — Sithu Ko
(74) *Attorney, Agent, or Firm* — Holland & Hart LLP

(57) ABSTRACT

Methods, systems, and devices for wireless communications are described. Generally, a user equipment (UE) may estimate one or more channel availability parameter values. The UE may then select, based on a co-channel configuration indicating a relationship between channel availability parameter values and patterns of sidelink resources, a pattern of sidelink resources (e.g., LTE resources) on which to transmit NR packets. In some examples, a special UE may receive individual or aggregated reports of channel availability parameter values. The special UE may select a pattern of sidelink resources (e.g., LTE resources) on which one of the reporting UEs is permitted to transmit NR packets, and may transmit a message activating the pattern of sidelink resources to the reporting UE. The reporting UE may then use the activated sidelink LTE resources for transmitting NR packets according to the indicated pattern.

30 Claims, 13 Drawing Sheets

(51) Int. Cl.
*H04W 74/08* (2009.01)
*H04W 24/10* (2009.01)

(56) References Cited

U.S. PATENT DOCUMENTS

| | | | |
|---|---|---|---|
| 2018/0234889 A1* | 8/2018 | Baghel | H04W 72/30 |
| 2020/0107236 A1 | 4/2020 | Tseng et al. | |
| 2020/0382992 A1* | 12/2020 | Shilov | H04W 72/02 |
| 2021/0105775 A1* | 4/2021 | Tseng | H04W 72/0453 |
| 2021/0168861 A1* | 6/2021 | Lee | H04W 72/02 |
| 2022/0015070 A1* | 1/2022 | Chen | H04W 72/23 |
| 2022/0201617 A1* | 6/2022 | Baek | H04W 52/24 |
| 2022/0256525 A1* | 8/2022 | Lin | H04W 88/06 |
| 2022/0287083 A1* | 9/2022 | Gomes Baltar | H04W 74/0808 |

FOREIGN PATENT DOCUMENTS

| | | |
|---|---|---|
| WO | WO-2020034323 A1 | 2/2020 |
| WO | WO-2020199908 A1 | 10/2020 |
| WO | WO-2021099359 A1 | 5/2021 |

\* cited by examiner

AUTONOMOUS CO-CHANNEL OPERATIONS

FIELD OF TECHNOLOGY

The following relates to wireless communications, including autonomous co-channel operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support autonomous co-channel operations. Generally, a user equipment (UE) may perform its own measurements of one or more channel availability parameter values, or may receive reports from other UEs of channel availability parameter values, or both. The UE may then select, based on a co-channel configuration indicating a relationship between channel availability parameter values and patterns of sidelink resources, a pattern of sidelink resources (e.g., LTE resources) on which to transmit NR packets. In some examples, a special UE (e.g., a platoon or group leader, scheduling UE, roadside unit (RSU), or the like), may receive individual or aggregated reports of channel availability parameter values. The special UE may select a pattern of sidelink resources (e.g., LTE resources) on which one of the reporting UEs is permitted to transmit NR packets, and may transmit a message activating the pattern of sidelink resources to the reporting UE. The reporting UE may then use the activated sidelink LTE resources for transmitting NR packets according to the indicated pattern.

A method for wireless communications at a first user equipment (UE) is described. The method may include receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, estimating one or more channel availability parameter values indicating an amount of available sidelink radio frequency resources associated with the first radio access technology, the second radio access technology, or both, selecting a pattern of sidelink resources associated with the first radio access technology based on a co-channel configuration and the estimated one or more channel availability parameter values, and communicating on the set of sidelink resources according to the selected pattern of sidelink resources.

An apparatus for wireless communications at a first UE is described. The apparatus may include a processor, memory coupled with the processor, and instructions stored in the memory. The instructions may be executable by the processor to cause the apparatus to receive a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, estimate one or more channel availability parameter values indicating an amount of available sidelink radio frequency resources associated with the first radio access technology, the second radio access technology, or both, select a pattern of sidelink resources associated with the first radio access technology based on a co-channel configuration and the estimated one or more channel availability parameter values, and communicate on the set of sidelink resources according to the selected pattern of sidelink resources.

Another apparatus for wireless communications at a first UE is described. The apparatus may include means for receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, means for estimating one or more channel availability parameter values indicating an amount of available sidelink radio frequency resources associated with the first radio access technology, the second radio access technology, or both, means for selecting a pattern of sidelink resources associated with the first radio access technology based on a co-channel configuration and the estimated one or more channel availability parameter values, and means for communicating on the set of sidelink resources according to the selected pattern of sidelink resources.

A non-transitory computer-readable medium storing code for wireless communications at a first UE is described. The code may include instructions executable by a processor to receive a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, estimate one or more channel availability parameter values indicating an amount of available sidelink radio frequency resources associated with the first radio access technology, the second radio access technology, or both, select a pattern of sidelink resources associated with the first radio access technology based on a co-channel configuration and the estimated one or more channel availability parameter values, and communicate on the set of sidelink resources according to the selected pattern of sidelink resources.

Some examples of the method, apparatuses, and non-transitory computer-readable medium described herein may further include operations, features, means, or instructions for identifying, in the co-channel configuration, an indication of a relationship between a set of channel availability parameter values and a set of patterns of sidelink resources, where each pattern of sidelink resources of the set of patterns of sidelink resources may be associated with at least one channel availability parameter value.

Some examples of the method, apparatuses, and non-transitory computer-readable medium described herein may further include operations, features, means, or instructions for mapping the estimated one or more channel availability parameter values to the set of channel availability parameter values, identifying the pattern of sidelink resources from the set of patterns of sidelink resources that may be associated with the estimated one or more channel availability parameter values based on the mapping, and selecting the pattern of sidelink resources based on identifying the pattern of sidelink resources from the set of patterns of sidelink resources.

In some examples of the method, apparatuses, and non-transitory computer-readable medium described herein, the indication of the relationship includes a lookup table.

In some examples of the method, apparatuses, and non-transitory computer-readable medium described herein, the channel availability parameter value includes an indication of quality of service, a priority level, a channel busy ratio, a penetration rate associated with the first radio access technology, the second radio access technology, or both, or any combination thereof.

In some examples of the method, apparatuses, and non-transitory computer-readable medium described herein, the penetration rate includes an amount of UEs of a set of UEs operating according to the second radio access technology.

Some examples of the method, apparatuses, and non-transitory computer-readable medium described herein may further include operations, features, means, or instructions for determining a set of component carriers supporting the co-channel operations based on at least one sidelink parameter of the set of sidelink parameters, where the set of component carriers includes one or more of a first subset of component carriers associated with the first radio access technology indicated as shareable or un-sharable with the second radio access technology.

Some examples of the method, apparatuses, and non-transitory computer-readable medium described herein may further include operations, features, means, or instructions for determining a set of sidelink resource pools based on the determined set of component carriers, where the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

In some examples of the method, apparatuses, and non-transitory computer-readable medium described herein, estimating the one or more channel availability parameter values may include operations, features, means, or instructions for performing one or more measurements on radio frequency resources associated with the first radio access technology for co-channel operation and detecting operations on radio frequency resources associated with the first radio access technology for the co-channel by devices using the first radio access technology, devices using the second radio access technology, or both.

In some examples of the method, apparatuses, and non-transitory computer-readable medium described herein, estimating the one or more channel availability parameter values may include operations, features, means, or instructions for receiving, from one or more additional UEs, channel availability report messages including channel availability parameter values, aggregating the received channel availability parameter values, and determining the one or more channel availability parameter values based on the aggregating.

A method for wireless communications at a second UE is described. The method may include receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, receiving a report message from a first UE, the report message including an indication of a set of channel availability parameter values indicating an amount of available sidelink radio frequency resources associated with the first radio access technology, the second radio access technology, or both, selecting a pattern of sidelink resources associated with the first radio access technology based on a co-channel configuration and the estimated one or more channel availability parameter values, and transmitting, to the first UE, an indication of the pattern of sidelink resources associated with the one or more channel availability parameter values for communication by the first UE according to the pattern of sidelink resources.

An apparatus for wireless communications at a second UE is described. The apparatus may include a processor, memory coupled with the processor, and instructions stored in the memory. The instructions may be executable by the processor to cause the apparatus to receive control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, receive a report message from a first UE, the report message including an indication of a set of channel availability parameter values indicating an amount of available sidelink radio frequency resources associated with the first radio access technology, the second radio access technology, or both, select a pattern of sidelink resources associated with the first radio access technology based on a co-channel configuration and the estimated one or more channel availability parameter values, and transmit, to the first UE, an indication of the pattern of sidelink resources associated with the one or more channel availability parameter values for communication by the first UE according to the pattern of sidelink resources.

Another apparatus for wireless communications at a second UE is described. The apparatus may include means for receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, means for receiving a report message from a first UE, the report message including an indication of a set of channel availability parameter values indicating an amount of available sidelink radio frequency resources associated with the first radio access technology, the second radio access technology, or both, means for selecting a pattern of sidelink resources associated with the first radio access technology based on a co-channel configuration and the estimated one or more channel availability parameter values, and means for transmitting, to the first UE, an indication of the pattern of sidelink resources associated with the one or more channel availability parameter values for communication by the first UE according to the pattern of sidelink resources.

A non-transitory computer-readable medium storing code for wireless communications at a second UE is described. The code may include instructions executable by a processor to receive control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations, receive a report message from a first UE, the report message including an indication of a set of channel availability parameter values indicating an amount of available sidelink radio frequency resources associated with the first radio access technology, the second radio access technology, or both, select a pattern of sidelink resources associated with the first radio access technology based on a co-channel configuration and the estimated one or more channel availability parameter values, and transmit, to the first UE, an indication of the pattern of sidelink resources associated with the one or more channel availability parameter values for communication by the first UE according to the pattern of sidelink resources.

Some examples of the method, apparatuses, and non-transitory computer-readable medium described herein may further include operations, features, means, or instructions for identifying, in the co-channel configuration, an indication of a relationship between a set of channel availability parameter values and a set of patterns of sidelink resources, where each pattern of sidelink resources of the set of patterns of sidelink resources may be associated with at least one channel availability parameter value.

Some examples of the method, apparatuses, and non-transitory computer-readable medium described herein may further include operations, features, means, or instructions for mapping the estimated one or more channel availability parameter values to the set of channel availability parameter values, identifying the pattern of sidelink resources from the set of patterns of sidelink resources that may be associated with the one or more channel availability parameter values based on the mapping, and selecting the pattern of sidelink resources based on identifying the pattern of sidelink resources from the set of patterns of sidelink resources.

In some examples of the method, apparatuses, and non-transitory computer-readable medium described herein, the indication of the relationship includes a lookup table.

In some examples of the method, apparatuses, and non-transitory computer-readable medium described herein, the channel availability parameter value includes an indication of quality of service, a priority level, a channel busy ratio, a penetration rate associated with the first radio access technology, the second radio access technology, or both, or any combination thereof.

In some examples of the method, apparatuses, and non-transitory computer-readable medium described herein, receiving the report message may include operations, features, means, or instructions for receiving, on a sidelink control channel or sidelink shared channel, a set of media access control (MAC) control elements (CEs), each MAC-CE associated with one of the set of channel availability parameter values, where each of the channel availability parameter values may be associated with a respective UE of a set of UEs including the set of UEs.

In some examples of the method, apparatuses, and non-transitory computer-readable medium described herein, receiving the report message may include operations, features, means, or instructions for receiving, on a sidelink control channel or sidelink shared channel, a MAC control element (CE) including a set of fields, where each field of the set of fields includes an indication of a channel availability parameter value of the set of channel availability parameter values, where each of the channel availability parameter values may be associated with a respective UE of a set of UEs including the set of UEs.

Some examples of the method, apparatuses, and non-transitory computer-readable medium described herein may further include operations, features, means, or instructions for determining a set of component carriers supporting the co-channel operations based on at least one sidelink parameter of the set of sidelink parameters, where the set of component carriers includes one or more of a first subset of component carriers associated with the first radio access technology indicated as shareable or un-sharable with the second radio access technology.

Some examples of the method, apparatuses, and non-transitory computer-readable medium described herein may further include operations, features, means, or instructions for determining a set of sidelink resource pools based on the determined set of component carriers, where the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

DETAILED DESCRIPTION

Figure 1:
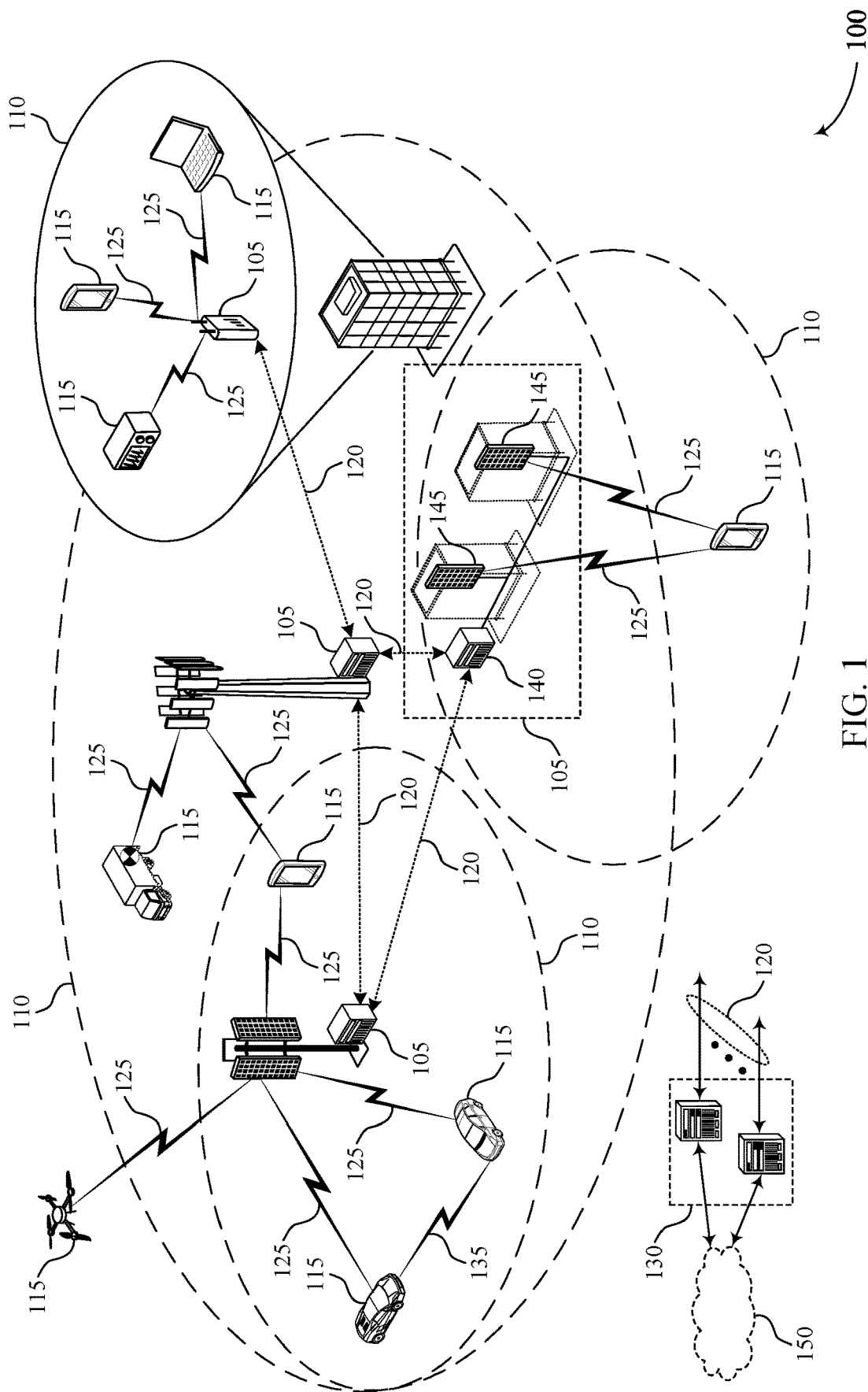
FIG. 1 illustrates an example of a wireless communications system that supports autonomous co-channel operations in accordance with aspects of the present disclosure.

A wireless communications system may include communication devices, such as a user equipment (UE) or a base station (for example, an eNodeB (eNB), a next-generation NodeB or a giga-NodeB, any of which may be referred to as a gNB, or some other base station), that may support multiple radio access technologies. Examples of radio access technologies include 4G systems, such as long-term evolution (LTE) systems, and 5G systems, which may be referred to as new radio (NR) systems. In some cases, the UE may support various applications, such as vehicle-to-everything (V2X) applications that may result in wideband operations to meet low latency and high data rate requirements of the V2X applications. In some cases, radio frequency spectrum bands (e.g., resources) allocated for each radio access technology may be inadequate. For example, a limited radio frequency spectrum band may be allocated for NR V2X operations. It may be desirable to improve wideband operations for V2X applications when the UE supports multiple radio access technologies, such as 4G LTE and 5G NR. That is, it may be desirable to dynamically support system resource utilization on sidelink when the UE supports both NR V2X and LTE V2X operations.

Various aspects of present disclosure relate to enabling the UE to support dynamic co-channel operation between NR V2X and LTE V2X. In some examples, the co-channel operation between NR V2X and LTE V2X may be managed autonomously by one or more UEs. As such, the UE may identify a co-channel configuration to enable the co-channel operation between NR V2X and LTE V2X. For example, the UE may identify co-channel configuration information indicating a relationship between different patterns of sidelink resources of one radio access technology (e.g., LTE) and different channel availability parameter values (e.g., UE penetration rates, channel busy ratios, sidelink reference signal received power, quality of service such as latency or reliability or priority for different packets or channels, or the like). The relationship may be defined in one or more lookup tables (LUTs). In some examples, the co-channel configuration may include an indication of carriers supporting or not supporting the co-channel operation. The co-channel configuration may also include resource pools on the carriers supporting the co-channel operation. Additionally, or alternatively, the co-channel configuration may indicate measurement and reporting for the co-channel operation.

In some examples, a UE may perform its own measurements of channel availability parameter values, or may receive reports from other UEs of channel availability parameter values, or both. The UE may then select, based on the co-channel configuration information, a pattern of sidelink resources (e.g., LTE resources) on which to transmit NR packets.

In some examples, a special UE (e.g., a platoon or group leader, scheduling UE, roadside unit (RSU), or the like), may receive individual or aggregated reports of channel availability parameter values. The special UE may select a pattern of sidelink resources (e.g., LTE resources) on which one of the reporting UEs is permitted to transmit NR packets, and may transmit a message activating the pattern of sidelink resources to UEs in proximity. The UE may then use the activated sidelink LTE resources for transmitting NR packets according to the indicated pattern.

By enabling the communication devices (e.g., one or more of the special UE or the UE) to support co-channel operations for multiple radio access technologies, the communication devices may reduce power consumption. In addition, by enabling the communication devices (e.g., one or more of the special UE or the UE) to support co-channel operations for multiple radio access technologies, the communication devices may experience decreased latency and increase reliability for wireless communication, among other examples.

Aspects of the disclosure are initially described in the context of wireless communications systems. Aspects of the disclosure are further illustrated by and described with reference to wireless communications systems, inter-RAT multi-carrier operation, and process flows. Aspects of the disclosure are further illustrated by and described with reference to apparatus diagrams, system diagrams, and flowcharts that relate to autonomous co-channel operations.

FIG. 1 illustrates an example of a wireless communications system 100 that supports autonomous co-channel operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units (RSU), or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may perform its own measurements of one or more channel availability parameter values, or may receive reports from other UEs 115 of channel availability parameter values, or both. The UE 115 may then select, based on a co-channel configuration indicating a relationship between channel availability parameter values and patterns of sidelink resources, a pattern of sidelink resources (e.g., LTE resources) on which to transmit NR packets. In some examples, a special UE 115 (e.g., a platoon or group leader, scheduling UE 115, roadside unit (RSU), or the like), may receive individual or aggregated reports of channel availability parameter values. The special UE 115 may select a pattern of sidelink resources (e.g., LTE resources) on which one of the UEs 115 is permitted to transmit NR packets, and may transmit a message activating the pattern of sidelink resources to the UE 115. The UE 115 may then use the activated sidelink LTE resources for transmitting NR packets according to the indicated pattern.

Figure 2:
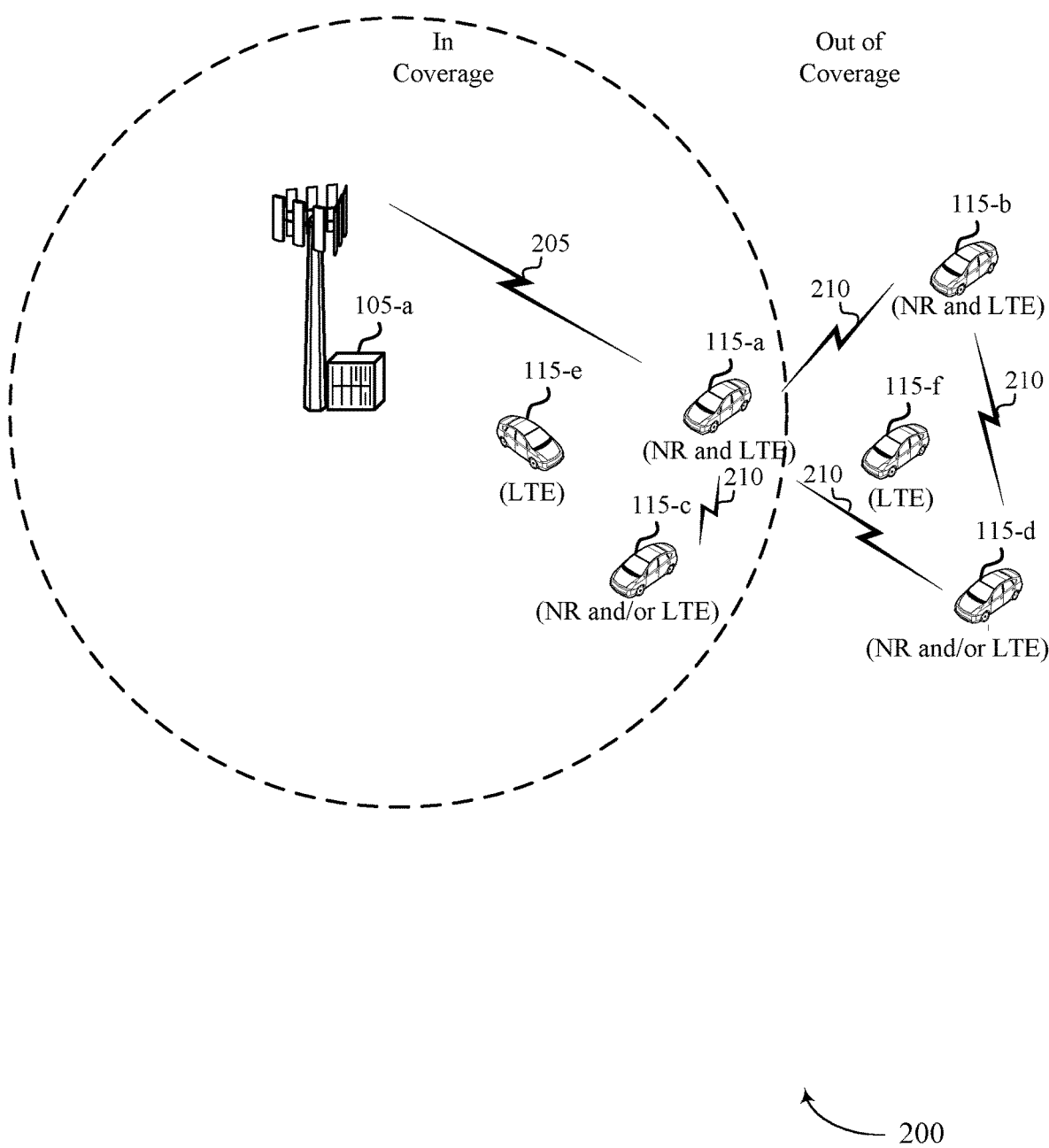
FIG. 2 illustrates an example of a wireless communications system that supports autonomous co-channel operations in accordance with aspects of the present disclosure.

FIG. 2 illustrates an example of a wireless communications system 200 that supports autonomous co-channel operations in accordance with aspects of the present disclosure. The wireless communications system 200 may implement aspects of the wireless communications system 100 or may be implemented by aspects of the wireless communications system 100 as described with reference to FIG. 1. For example, the wireless communications system 200 may include a base station 105-a, a UE 115-a through a UE 115-f, which may be examples of corresponding devices as described with reference to FIG. 1. In the example of FIG. 2, the wireless communications system 200 may be a V2X system and one or more of the base station 105-a and the UE 115-a through the UE 115-f may supports V2X operations.

One or more of the base station 105-a and the UE 115-a through the UE 115-f may be configured with multiple antennas, which may be used to employ techniques such as transmit diversity, receive diversity, multiple-input multiple-output communications, or beamforming, or any combination thereof. The antennas of one or more of the base station 105-a and the UE 115-a through the UE 115-f may be located within one or more antenna arrays or antenna panels, which may support multiple-input multiple-output operations or transmit or receive beamforming. The base station 105-a may have an antenna array with a number of rows and columns of antenna ports that the base station 105-a may use to support beamforming of wireless communications with the UE 115-a through the UE 115-f. Likewise, one or more of the UE 115-a through the UE 115-f may have one or more antenna arrays that may support various multiple-input multiple-output or beamforming operations. Additionally, or alternatively, an antenna panel may support radio frequency beamforming for a signal transmitted via one or more antenna ports.

The base station 105-a may perform wireless communication (e.g., transmit or receive control information or data) directly with one or more of the UE 115-a through the UE 115-f via an access link 205 (e.g., a Uu interface). Likewise, one or more of the UE 115-a through the UE 115-f may perform wireless communication (e.g., transmit or receive control information or data) directly with the base station via an access link 205 (e.g., a Uu interface). In the wireless communications system 200, a UE 115 (e.g., the UE 115-a through the UE 115-f) may perform wireless communication (e.g., transmit or receive sidelink control information or sidelink data) with another UE 115 in the wireless communications system 200 via a sidelink 210 (e.g., a PC5 interface). In some examples, the base station 105-a may perform wireless communication (e.g., transmit or receive control information or data) indirectly with one or more of the UE 115-a through the UE 115-f by communicating wireless communication to an intermediate UE 115 via an access link 205 (e.g., a Uu interface). The intermediate UE 115 may forward the wireless communication to a destination UE 115 via a sidelink 210.

In some examples, one or more UEs 115 (e.g., UE 115-b, UE 115-f, and UE 115-d) may leave a coverage area associated with base station 105-d, or may otherwise be located out of coverage of base station 105-d. In such examples, the UEs may communicate autonomously on sidelinks 210 (e.g., in sidelink mode 2).

In the example of FIG. 2, one or more of the UE 115-a through the UE 115-f may support one or more radio access technologies. For example, the UE 115-b and the UE 115-d may support both a first radio access technology (e.g., 4G LTE) and a second radio access technology (e.g., 5G NR). The wireless communications system 200 may support dynamic efficient system resource utilization on sidelink 210 for a UE 115 supporting both 4G LTE and 5G NR (e.g., the UE 115-a in coverage and the UE 115-b out of coverage). To support the dynamic efficient system resource utilization, one or more of the UEs 115-a through UE 115-f may be enabled to determine when dynamic co-channel operation is allowed or not while in or out of coverage from the base station 105-a, and which carriers can or cannot be operated if such dynamic co-channel operation is allowed over NR and LTE resource pools, among other examples. Additionally, the wireless communications system 200 may enable the base station 105-a to manage the dynamic co-channel operation while mitigating or decreasing interference to LTE UEs and resource utilization for NR UEs. As such, for a UE 115 supporting both 5G NR and 4G LTE, the UE 115 may operate with either NR resources or LTE resources managed dynamically by the UEs 115 for improved resource utilization in the wireless communications system 200 as described herein.

For example, various aspects of present disclosure relate to enabling one or more of the UE 115-a through the UE 115-f to support dynamic co-channel operation between NR V2X and LTE V2X. In some examples, the co-channel operation between NR V2X and LTE V2X may be managed by the UEs 115. As such, one or more of the UE 115-a through the UE 115-f may identify a co-channel configuration (e.g., preconfigured or configured at one or more of the UEs 115) to enable the co-channel operation between NR V2X and LTE V2X. For example, the co-channel configuration may include an indication of resource pools (e.g., patterns of sidelink resources) on the carriers supporting the co-channel operation. The patterns of sidelink resources may be mapped (e.g., via a lookup table (LUT)) with different channel availability parameter values (e.g., such as channel status measurements, quality of service values, UE penetration rates, or the like). Additionally, or alternatively, the co-channel configuration may indicate measurement and reporting for the co-channel operation. Thus, a UE 115 may identify an NR packet for transmission on a co-channel according to the co-channel configuration. The UE may estimate or otherwise determine (e.g., based on distributed measurements and reporting across multiple UEs 115) a channel availability parameter value, and may map the channel availability parameter value to a pattern of sidelink resources associated with the first radio access technology (e.g., LTE). The UE may then transmit the NR packet using LTE resources on the co-channel according to the pattern of sidelink resources. In some examples, a UE 115 (e.g., UE 115-d) may be a special UE. For instance, UE 115-d may be a platoon leader or group leader of a group of V2X UEs 115 (e.g., UE 115-b). In some examples, a special UE may be a roadside unit (RSU), a cluster head, a scheduling UE 115, or the like. In such examples, the UE 115-d may receive one or more reports, or an aggregated report, from one or more neighbor UEs 115. The reports may include an indication of channel availability parameter values for one or more surrounding UEs 115. The UE 115-d may then map the availability parameter value or values to a pattern of sidelink resources associated with the first RAT, and may transmit an indication of the pattern of sidelink resources to one or more UEs 115 (e.g., UE 115-b). In such examples, the receiving UE 115 (e.g., UE 115-b) may utilize LTE resources according to the indicated pattern of sidelink resources received from the special UE 115-d.

Figure 3:
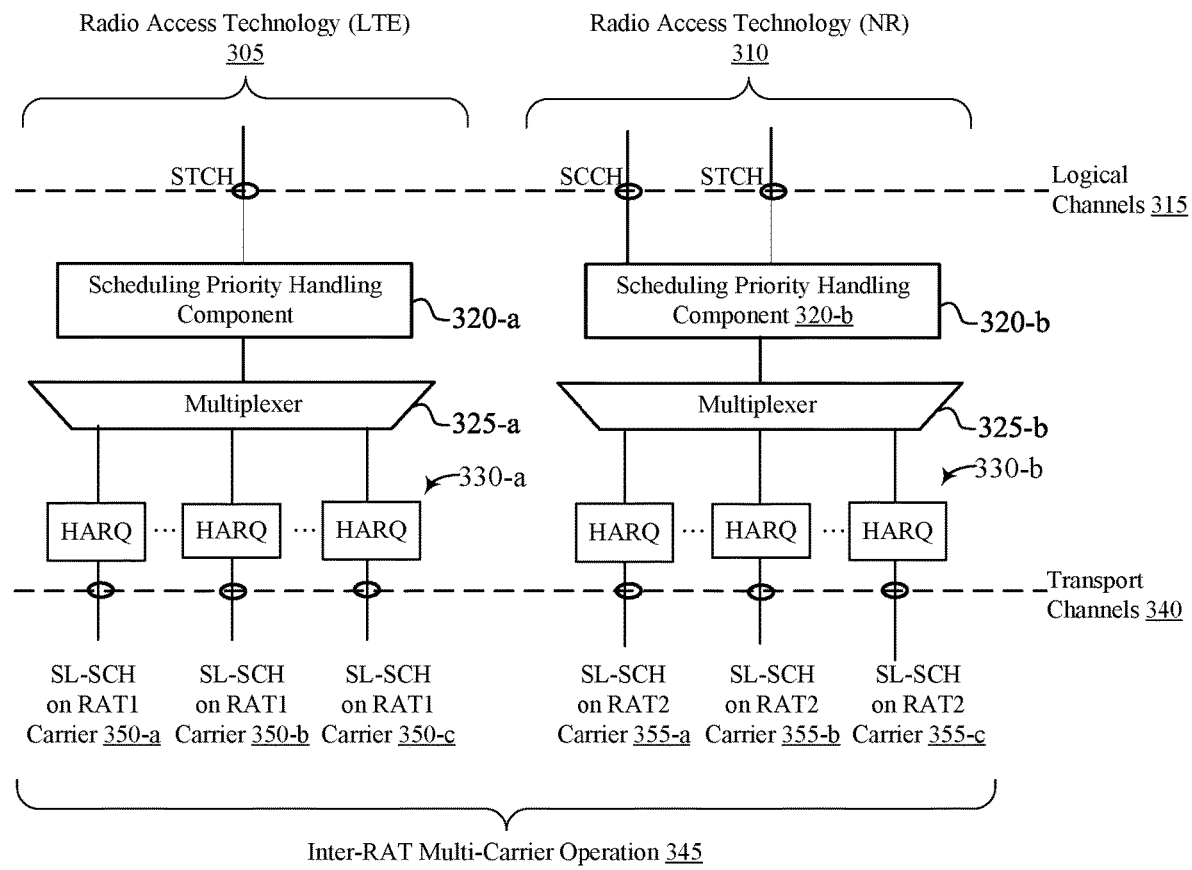
FIG. 3 illustrates an example of a multi-carrier operation that supports autonomous co-channel operations in accordance with aspects of the present disclosure.

FIG. 3 illustrates an example of a multi-carrier operation configuration 300 that supports autonomous co-channel operations in accordance with aspects of the present disclosure. The multi-carrier operation 300 may implement or be implemented by one or more aspects of the wireless communications system 100 and the wireless communications system 200. For example, the multi-carrier operation configuration 300 may be based on a configuration by a base station 105, and implemented by a UE 115 for managing co-channel operations for multiple radio access technologies. The multi-carrier operation 300 may illustrate an example of a protocol stack including a MAC layer for managing co-channel operations for multiple radio access technologies. In the example of FIG. 3, some MAC operations of the MAC layer may also be omitted, and other MAC operations may be added to the MAC layer.

The multi-carrier operation 300 may include a first radio access technology 305 (e.g., 4G LTE) and a second radio access technology 310 (e.g., 5G NR). Each of the first radio access technology 305 (e.g., 4G LTE) and the second radio access technology 310 (e.g., 5G NR) may be associated with one or more logical channels 315. Examples of logical channels include a broadcast control channel (BCCH) used for transmission of system information, a common control channel (CCCH) used for transmission of control information, a dedicated control channel (DCCH) used also for transmission of control information, a multicast control channel (MCCH) used for multicast transmission of control information, a dedicated traffic channel (DTCH) used for transmission of downlink or uplink data, or both, to and from a UE 115 via a Uu interface, a multicast traffic channel (MTCH) used for transmission of downlink data to and from a UE 115 via a Uu interface, a sidelink traffic channel (STCH) used for transmission of sidelink data via a PC5 interface, or sidelink control channel (SCCH) used for transmission of sidelink control information via a PC5 interface.

The first radio access technology 305 (e.g., 4G LTE) may be associated with a scheduling priority handling component 320-a, and the second radio access technology 310 (e.g., 5G NR) may be associated with a scheduling priority handling component 320-b for managing co-channel operations. The first radio access technology 305 (e.g., 4G LTE) may be associated with a multiplexer 325-a, and the second radio access technology 310 (e.g., 5G NR) may be associated with a multiplexer 325-b for managing co-channel operations. The multiplexer 325-a and the multiplexer 325-b may support multiplexing of different logical channels and mapping of the logical channels to one or more transport channels 340. In some examples, the multiplexer 325-a and the multiplexer 325-b may support multiplexing one or more HARQ 330-a and HARQ 330-b, and mapping of the logical channel to one or more transport channels 340. Examples of the one or more transport channels 340 include a broadcast channel (BCH), a downlink shared channel (DL-SCH), a multicast channel (MCH), and an uplink shared channel (UL-SCH) via a Uu interface, or a sidelink shared channel (SL-SCH) via a PC5 interface.

In the example of FIG. 3, a UE 115 may support an inter-RAT multi-carrier operation 345, which may include a first set of component carriers 350 (e.g., a component carriers 350-a, a component carriers 350-b, and a component carriers 350-c) associated with the first radio access technology (e.g., 4G LTE) and a second set of component carriers 355 (e.g., a component carriers 355-a, a component carriers 355-b, and a component carriers 355-c) associated with the second radio access technology (e.g., 5G NR).

Figure 4:
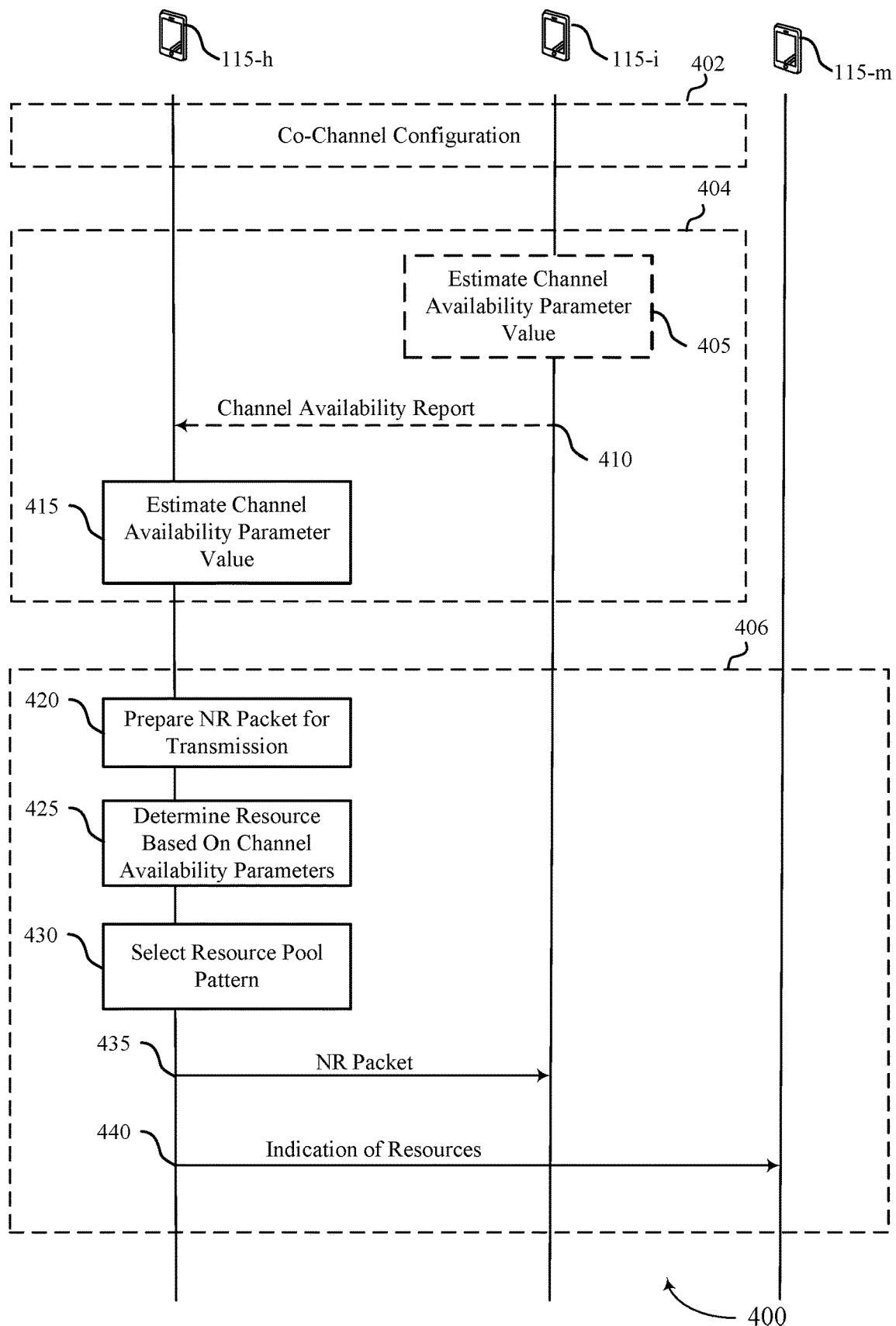
FIG. 4 illustrates an example of a process flow that supports autonomous co-channel operations in accordance with aspects of the present disclosure.

FIG. 4 illustrates an example of a process flow 400 that supports autonomous co-channel operations in accordance with aspects of the present disclosure. The process flow 400 may implement or be implemented by one or more aspects of the wireless communications system 100 and the wireless communications system 200. For example, the process flow 400 may include a UE 115-*h*, a UE 115-*i*, and UE 115-*m*, which may be examples of a UE 115 described herein. The UE 115-*h* may be referred to as a transmitting UE supporting multiple radio access technologies, such as 4G LTE and 5G NR. The UE 115-*i* may be referred to as one or more receiving UEs (e.g., for unicast or groupcast or broadcast) supporting a single or multiple radio access technology, such as 5G NR, or both 5G NR and 4G LTE. The UE 115-*m* may represent one or more UEs supporting a single radio access technology such as 4G LTE (e.g., LTE UEs). For a communication device, such as one or more of the UE 115-*h* or the UE 115-*i* supporting both NR V2X and LTE V2X (e.g., outside of a geographic coverage of a base station 105), the communication device may operate with either NR resources or LTE resources managed dynamically by the UEs 115 for improved system resource utilization. In the following description of the process flow 400, operations between the UE 115-*h*, and the UE 115-*i* may occur in a different order or at different times than as shown. Some operations may also be omitted from the process flow 400, and other operations may be added to the process flow 400.

According to some aspects of the process flow 400, one or more of the UE 115-*h* or the UE 115-*i* may identify or receive co-channel configuration information to support co-channel operation as described herein, at 402, of the process flow 400. Co-channel configuration information may include (e.g., via at least one sidelink parameter of the set of sidelink parameters) a set of component carriers supporting the co-channel operation associated with the first radio access technology (e.g., 4G LTE) and the second radio access technology (e.g., 5G NR). For example, the at least one sidelink parameter of the set of sidelink parameters may include an indication for co-channel operation (e.g., a bit indication may be set to a respective value, such as sl-nr-lte-cochannel is set to "1" for supporting co-channel operation). For example, the at least one sidelink parameter of the set of sidelink parameters may indicate sidelink NR carriers shared with LTE or LTE carriers shared with NR (e.g., sl-nr-lte-cochannel-carrier-list or sl-nr-lte-cochannel-carrier-combined-list). Additionally or alternatively, the at least one sidelink parameter of the set of sidelink parameters may indicate sidelink NR carriers not shared with LTE or LTE carriers not shared with NR (e.g., sl-nr-lte-cochannel-carrier-block-list or sl-nr-lte-cochannel-carrier-combined-block-list). One or more of the UE 115-*h* or the UE 115-*i* may determine the set of component carriers supporting the co-channel operation associated with the first radio access technology (e.g., 4G LTE) and the second radio access technology (e.g., 5G NR) based at least in part on the at least one sidelink parameter of the set of sidelink parameters. In some examples, the at least one sidelink parameter of the set of sidelink parameters may indicate non-overlapped sidelink NR resource pools (e.g., sl-nr-pool-list), sidelink LTE resource pools (e.g., sl-lte-pool-list), or both. In some other examples, the at least one sidelink parameter of the set of sidelink parameters may indicate overlapped or shared sidelink NR-LTE co-channel resource pools (e.g., sl-nr-lte-co-channel-pool-list).

One or more of the UE 115-*h* or the UE 115-*i* may determine at least one of the set of sidelink resource pools based at least in part on the at least one sidelink parameter of the set of sidelink parameters. In some examples, the UEs 115 may identify, of the one or more sidelink parameters of the set of sidelink parameters, measurement and report parameters or instructions supporting co-channel operation. In some examples, the measurement and report may include at least sidelink reference signal received power (SL-RSRP) or channel busy ratio (CBR) or UE penetration rate, wherein the UE penetration rate may include at least NR UE penetration rate or LTE UE penetration rate. For example, an NR UE penetration rate may be based on the percentage of NR UEs operating with the second radio access technology (e.g., NR UEs) over the sidelink frequency resources associated to the first radio access technology (e.g. 4G LTE) and shared with the second radio access technology for co-channel in proximity. An LTE UE penetration rate is based on the percentage of UEs operating with the first radio access technology (e.g. LTE UEs) over the sidelink frequency resources associated to the first radio access technology and shared with the second radio access technology for co-channel in proximity. For example, the co-channel configuration information may include one or more sidelink parameters of the set of sidelink parameters for measurement configuration and/or report configuration supporting co-channel operation, e.g., SL-RSRP or CBR or UE penetration rate measurement configuration with sl-MeasConfigCommon (e.g., common configuration) or MeasConfigInfoToAddModList (e.g., UE dedicated configuration) and/or SL-RSRP or CBR or UE penetration rate report configuration with sl-ReportConfigCommon (e.g., common configuration) or sl-ReportConfigList (e.g., UE dedicated configuration) including EventTriggerConfig (e.g., for event trigger report) or PeriodicalReportConfig for periodic report, or both. In some examples (e.g., at 404), the UE 115-*h* and the UE 115-*i* may estimate or report channel availability parameter values (e.g., SL-RSRP or CBR or UE penetration rates) according to a reporting or estimating configuration indicated in the co-channel configuration information identified at 402. Resource pools that support co-channel operations may be referred to as patterns of sidelink resources. The patterns of sidelink resources may define time intervals during which a UE 115 supporting NR communications (e.g., UE 115-*h*) may transmit NR packets using LTE resources on the co-channel. Thus, resource pools on the carriers that support NR-LTE co-channel operations may be defined by non-overlapped sidelink NR pools (e.g., as indicated in sl-nr-pool-list parameters) and sidelink LTE pools (e.g., as indicated in sl-lte-pool-list). Overlapped or shared sidelink NR-LTE co-channel pools may be defined via one or more parameters (e.g., sl-nr-lte-co-channel-pool-list).

In some examples, the co-channel configuration information may include an indication of a relationship between a set of channel availability parameter values and a set of patterns of sidelink resources. The channel availability parameter values may include channel quality status or channel busy ratios for the sidelink channel (e.g., for LTE communications or NR communications or both on the sidelink channel as part of the co-channel operation). The channel availability parameter values may include quality of service values for the sidelink communications (e.g., the priority associated with LTE communications, the priority or reliability or latency associated with NR communications, or both). In some examples, the channel availability parameter values may include priority values (e.g., for a generated NR packet). For instance, some NR packets generated at 420 may be associated with higher priority transmissions (e.g., ultra-reliable low-latency communications (URLLC), emergency communications, or the like), and other NR packets may be associated with lower priority transmissions. The channel availability parameter values may include UE penetration rate (e.g., an NR penetration rate). An NR penetration rate, for example, may refer to a percentage of UEs 115 supporting NR capability in a wireless communications system 100. An NR penetration rate may be determined based on an indication (e.g., indicating an NR UE) in a MAC-CE message, or a sidelink control information message (SCI) (e.g., SCI or SCI2), or based on measurements (e.g., such as contention-based SL-RSRP or CBR measurement or decoding control channel (e.g., PSCCH with SCI part 1) or data channel (e.g., PSSCH with SCI part 2 or MAC CE) for an NR communication). Channel availability measurement parameters may be defined (e.g., in the configuration information) by one or more parameters, such as an NR penetration rate measurement configuration may be indicated via a parameter sl-measConfig (e.g., contained in sl-MeasConfigCommon or MeasConfigInfoToAddModList) and an NR Penetration rate report may be indicated via sl-ReportConfig (e.g., contained in sl-ReportConfigCommon or sl-ReportConfigList), with eventtrigerconfig for event triggered report and/or PeriodicReportConfig for periodic report.

The pattern of sidelink resources may refer to resource pool patterns. For example, each bit of a bit map may indicate useable slots of a set of slots. The indicated slots of the set of slots may be time intervals during which the transmitting UE 115-h is permitted to utilize LTE resources for transmitting NR packets.

The relationship between the channel availability parameter values and the set of patterns of sidelink resources may define which pattern of sidelink resources the UE 115-h is permitted to use based on the channel availability parameter values. In some examples, the relationship may be defined in one or more lookup tables (LUTs). For instance, an LUT may define a relationship between NR penetration rates (e.g., a percentage or amount of UEs that support or utilize NR communications) and patterns of sidelink resources, as illustrated with reference to table 1:

TABLE 1

| Index/Code Point | NR Penetration Rate | Resource Pool Pattern |
| --- | --- | --- |
| 000 | 100% | Pool-Patterns_0 |
| 001 | 90% | Pool-Patterns_1 |
| 010 | 80% | Pool-Patterns_2 |
| 011 | 65% | Pool-Patterns_3 |
| 100 | 50% | Pool-Patterns_4 |
| 101 | 35% | Pool-Patterns_5 |
| 110 | 20% | Pool-Patterns_6 |
| 111 | 5% | Pool-Patterns_7 |

In some examples, a LUT may be based on multiple channel availability parameters. For instance, the LUT may indicate different subsets of a first channel availability parameter (e.g., quality of service, SL-RSRP, CBR, or NR penetration rate) with reference to a second channel availability parameter (e.g., NR penetration rate, SL-RSRP, CBR, or quality of service). An example with NR penetration rates as the first channel availability parameter for different subsets and with quality of service as the second channel availability parameter for different entries of each subsets is illustrated with reference to table 2:

TABLE 2

| Index/Code Point | NR Penetration Rate | QoS/Priority | Resource Pool Pattern |
| --- | --- | --- | --- |
| 0 000 | 100% | 2 | Pool-Patterns_1 |
| 0 001 | | 4 | Pool-Patterns_2 |

TABLE 2-continued

| Index/Code Point | NR Penetration Rate | QoS/Priority | Resource Pool Pattern |
| --- | --- | --- | --- |
| 0 010 | | 6 | Pool-Patterns_3 |
| ... | ... | ... | ... |

In some examples, each channel availability parameter may be mapped to one or more resource pool patterns, or each resource pool pattern may be mapped to one or more channel availability parameters. As described herein (e.g., at 406), a UE 115-h may map one or more estimated or indicated channel availability parameters to a pattern of sidelink resources (e.g., according to a LUT indicated in the Co-Channel configuration at 402).

In some examples, the co-channel configuration information may be preconfigured, signalled, or any combination thereof. For example, the co-channel configuration information may be preconfigured or hardcoded at the UE 115-h, the UE 115-i, and any other UEs 115. In some examples, the one or more parameter values of the co-channel configuration information may be include in one or more standards documents. In some examples, one or more UEs 115 may indicate the co-channel configuration information to each other (e.g., via RRC signalling, SCI or SCI2, or the like). In some examples, a base station 105 may indicate (e.g., via SIB, system information (SI), RRC configuration message, MAC CE or DCI activation or indication, or any combination) the co-channel configuration information to the UEs 115-h and the UE 115-i (e.g., via a Uu link while the UEs 115 are in the coverage area of the base station 105). In some examples, a message (e.g., a sidelink message from another UE 115 or a downlink message from a base station 105, or the like) may activate or indicate (e.g., PC5 MAC CE or SCI by another UE via PC5 interface, or MAC CE or DCI by baste station 105 via Uu interface) preconfigured parameters included in the co-channel configuration information (e.g., that are configured, preconfigured or otherwise hardcoded at the UE 115).

In some examples, at 404, UE 115-h may estimate one or more channel availability parameters. For example, at 415, the UE 115-h may perform SL-RSRP or CBR measurement or UE penetration rate estimation based on the measurement or UE detection. For instance, the UE 115-h may estimate a UE penetration rate associated with the second radio access technology (e.g., NR penetration rate) based at least in part on UE measurement such as SL-RSRP or CBR associated to the first radio access technology (e.g., SL-RSRP or CBR measurement with LTE) and the second radio access technology (e.g., SL-RSRP or CBR measurement with NR) respectively or UE detection (e.g., an NR UE with an indication of supporting the second radio access technology, or an LTE UE without an indication of supporting the second radio access technology).

Additionally or alternatively, the UE 115-h may determine a set of suitable resources associated with one or more the first radio access technology (e.g., 4G LTE) or the second radio access technology (e.g., 5G NR). The UE 115-h may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources. The UE 115-h may monitor NR communications, or receive sidelink UE capability or sidelink UE assistance information message, or any combination thereof, from other UEs (e.g., UEs 115-*i*) indicating that the other UEs support the second radio access technology, to determine the ratio of a number of UEs 115 (e.g., of a set of total UEs 115 within a threshold distance or in a configured group, fleet, or platoon of UEs, or the like) that support or are currently utilizing NR communications to a number of total UEs 115 (e.g., UEs 115 that support or are currently utilizing NR communications and UEs 115 that do not support or are not currently utilizing NR communications) for NR penetration ratio. Or to determine the ratio of a number of UEs 115 (e.g., of a set of total UEs 115 within a threshold distance or in a configured group, fleet, or platoon of UEs, or the like) that do not support or are not currently utilizing NR communications with a number of total UEs 115 (e.g., UEs 115 that support or are currently utilizing NR communications and UEs 115 that do not support or are not currently utilizing NR communications) for LTE penetration ratio.

In some examples, the UE 115-*h* may determine a QoS or a priority level (e.g., for LTE resources or NR resources, or for an NR packet prepared at 420). In some examples, the UE 115-*h* may measure SL-RSRP or CBR to determine the difference between the SL-RSRP or CRB for the LTE resources and the SL-RSRP or CRB for the NR resources. The UE 115-*h* may also determine that either LTE resources or NR resources are used as the suitable resources based on comparing the difference with a threshold as one sidelink parameter of a set of sidelink parameters in co-channel configuration information. In some examples, the UE 115-*h* may measure SL-RSRP or CBR to determine the ratio between the SL-RSRP or CRB for the LTE resources and the SL-RSRP or CRB for the NR resources or vice versa. The UE 115-*h* may also determine that either LTE resources or NR resources are used as the suitable resources based on comparing the ratio with a threshold as one sidelink parameter of a set of sidelink parameters in co-channel configuration information. In some examples, the UE 115-*h* may measure the SL-RSRP or CBR for the LTE resources and the SL-RSRP or CRB for the NR resources. The UE 115-*h* may also decide that either LTE resources or NR resources are used as the suitable resources based on comparing the SL-RSRP or CBR for the LTE resources with a threshold as one sidelink parameter of a set of sidelink parameters in co-channel configuration information and/or comparing the SL-RSRP or CBR for the NR resources with a threshold as another sidelink parameter of a set of sidelink parameters in co-channel configuration information.

In some examples, the UE 115-*h* may determine one or more channel availability parameters based at least in part on receiving one or more channel availability reports. For example, one or more neighboring UEs 115 (e.g., UE 115-*i*) may estimate one or more channel availability parameters. For example, at 405, the UE 115-*i* may perform SL-RSRP or CBR measurement and/or UE penetration rate estimation. For instance, the UE 115-*i* may estimate a UE penetration rate associated with the second radio access technology (e.g., NR penetration rate) based at least in part on UE measurement or UE detection. Additionally, or alternatively, the UE 115-*i* may determine a set of suitable resources associated with one or more the first radio access technology (e.g., 4G LTE) or the second radio access technology (e.g., 5G NR). The UE 115-*i* may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources. The UE 115-*i* may monitor NR communications, or receive sidelink UE capability or sidelink UE assistance information message, or any combination thereof, to determine an NR penetration rate by determine a number of UEs 115 (e.g., of a set of total UEs 115 within a threshold distance or in a configured group, fleet, or platoon of UEs, or the like) that support or are currently utilizing NR communications or to determine an LTE penetration rate by determine a number of UEs 115 (e.g., of a set of total UEs 115 within a threshold distance or in a configured group, fleet, or platoon of UEs, or the like) that do not support or are not currently utilizing NR communications. In some examples, the UE 115-*i* may determine a SL-RSRP or CBR for the LTE resources, the NR resources, or both. Having estimated (e.g., measured) the channel availability parameter values, the UE 115-*i* may transmit a channel availability report to the UE 115-*h*. The channel availability report message may be a sidelink UE assistance message or a PC5 RRC signaling message, PC5 MAC-CE (e.g., on a PSSCH), or a sidelink control information (e.g., SCI part 1 on a PSCCH or SCI part 2 on PSSCH), or the like, on PC5 interface.

In such examples, upon receiving the channel availability report at 415, the UE 115-*h* may estimate the channel availability parameter values. In some examples, the UE 115-*h* may monitor for and receive multiple channel availability reports (e.g., from multiple other UEs 115). In some examples, the UE 115-*h* may aggregate channel availability parameter values from multiple received channel availability reports. In some examples, the UE 115-*h* may combine received channel availability parameter values with its own estimated or measured channel availability parameter values to generate a complete or updated set of one or more channel availability parameter values. Thus, in some examples, the UE 115-*h* may estimate a channel availability parameter value (e.g., SL-RSRP or CBR or NR penetration rate or LTE penetration rate) based on its own measurements or its detection of other channel availability parameter values (e.g., detection of other NR and LTE UEs), based on received estimations of channel availability parameter values (e.g., SL-RSRP or CBR or NR penetration rate or LTE penetration rate) from other UEs 115 (e.g., UE 115-*i*), or any combination thereof.

At 406, the UE 115-*h* may autonomously perform dynamic NR-LTE co-channel operations. The UE 115-*h* may identify an NR packet for transmission, and may determine whether to utilize LTE resources, and which LTE resources to utilize, based on a relationship between the estimated channel availability parameter values (e.g., determined at 415 or updated at 425) and the patterns of sidelink resources indicated in the co-channel configuration information.

At 420, the UE 115-*h* may prepare an NR packet for transmission. The UE 115-*h* may identify that an NR packet is scheduled for or otherwise ready for transmitting (e.g., to UE 115-*i*. In some examples, it may be beneficial to utilize LTE resources for transmitting the NR packet.

At 425, the UE 115-*h* may determine where to use LTE resources for transmitting the NR packet on the co-channel configuration. The UE 115-*h* may determine whether to utilize LTE resources for transmitting the NR packet based on one or more conditions (e.g., based on one or more current values (e.g., current measurements or UE detection) or pending values (e.g., previous measurements or UE detection) for a channel availability parameter). For example, the UE 115-*h* may determine a QoS requirement for the packet (e.g., a latency or reliability requirement, a priority for the packet, or the like). In some examples, the UE 115-*h* may determine an SL-RSPR or CBR over an NR resource pool (e.g., configured or indicated in the co-channel configuration information) for NR channel status (e.g., if NR channel is congested). In some examples, the UE 115-*h* may determine an estimated NR penetration rate or LTE penetration rate (e.g., as determined at 404). In some examples, the UE 115-*h* may utilize the LUT configured in the co-channel configuration information to determine whether to utilize the LTE resources for transmitting the NR packet. In some examples, the UE 115-*h* may determine whether the determined channel availably parameter value satisfies a threshold value (e.g., as exemplified at 404). If so, then the UE 115-*h* may proceed to map the determined channel availability parameter value to a pattern of sidelink resources based on the channel availability parameter value satisfying the threshold.

At 430, the UE 115-*h* may determine resources on which to transmit (e.g., LTE resources) based at least in part on the estimated channel availability parameter values (e.g., as determined at 404), and the mapping relationships indicated in the co-channel configuration. For example, the UE may map the channel availability parameter value to a entry of the LUT (e.g., table 1 or table 2, or the like). For instance, if table 1 is configured in the co-channel configuration information, and the estimated channel availability parameter is an NR penetration rate of 90%, then the UE 115-*h* may select pool-pattern_1. Pool-pattern_1 may define a pattern of time resources (e.g., slots) during which the UE 115-*h* is permitted to utilize LTE resources for transmitting the NR packet. In some examples, the UE 115-*h* may determine into what range of channel availability parameter values an estimated channel availability parameter value falls. For instance, if the channel availability parameter is 94%, the co-channel configuration information may instruct the UE 115-*h* to select pool-pattern_0 (e.g., pool-pattern_0 applies to an NR penetration rate that is above 90% and up to 100%, while pool-patter_1 applies to an NR penetration rate that is above 80% and up to 90%, etc. Such ranges may apply to any channel availability parameter value.

In some examples, the UE 115-*h* may consider multiple channel availability parameter values to select the pattern of sidelink resources. For instance, if table 2 is configured in the co-channel configuration information, and the UE 115-*h* estimates an NR rate of 100% and a QoS of 4, then the UE 115-*h* may select Pool-Patterns 1. LUTs (e.g., such as table 2) may be configured in the co-channel configuration information to include any number of columns representing any number of or combination of channel availability parameter values.

At 435, the UE 115-*h* may transmit the NR packet. The UE 115-*h* may transmit the NR packet according to the resources selected at 430. For instance, if the UE 115-*h* selected LTE resources based on a resource pattern over LTE resources on which to transmit the NR packet, then the UE 115-*h* may transmit one or multiple transmissions of the NR packet on the LTE resources selected from the determine resource pool pattern.

At 440, the UE 115-*h* may transmit an indication of sidelink resources. For instance, the UE 115-*h* may transmit, to the UE 115-*m* supporting only LTE, an indication of which sidelink resources the NR packet is to be transmitted on (e.g., at 435). In some examples, the UE 115-*h* may transmit an indication of the selected pattern of sidelink resources. In some examples, the UE 115-*h* may transmit an indication of one or more reserved sidelink resources (e.g., which may be a subset of an available pattern of sidelink resources selected at 430). The indication may be included in an SCI message using the first radio access technology (e.g., an LTE SCI).

In some examples, as described in greater detail with reference to FIG. 5, a special UE 115 may perform scheduling functions, or may otherwise indicate to other UEs 115 which patterns of sidelink resources to use for transmitting NR packets using LTE resources on a co-channel.

Figure 5:
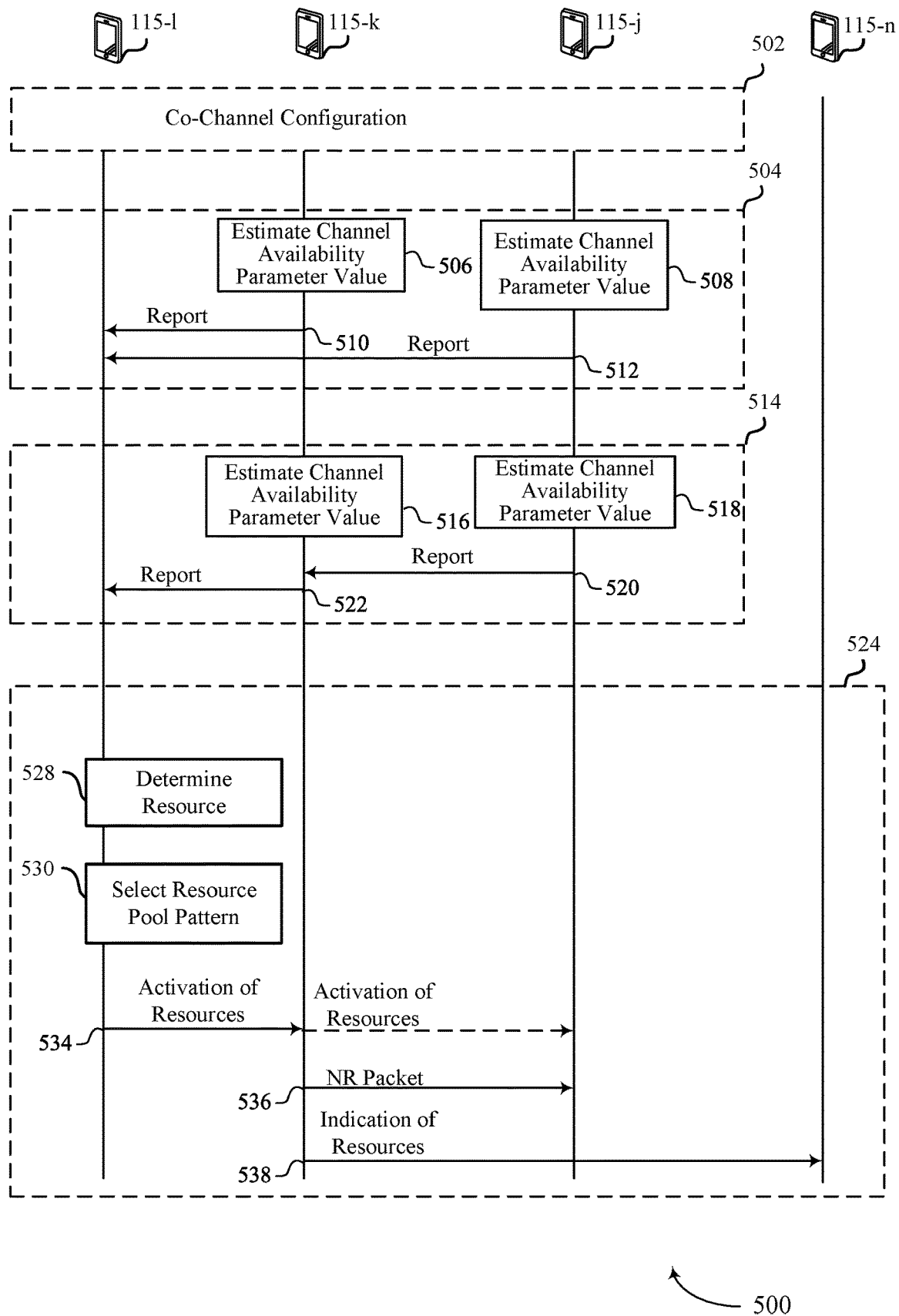
FIG. 5 illustrates an example of a process flow that supports autonomous co-channel operations in accordance with aspects of the present disclosure.

FIG. 5 illustrates an example of a process flow 500 that supports autonomous co-channel operations in accordance with aspects of the present disclosure. The process flow 500 may implement or be implemented by one or more aspects of the wireless communications system 100 and the wireless communications system 200. For example, the process flow 500 may include a UE 115-*k*, a UE 115-*j*, a UE 115-*n*, and a UE 115—which may be examples of UEs 115 described herein. The UE 115-*k* may be referred to as a transmitting UE supporting multiple radio access technologies, such as 4G LTE and 5G NR. The UE 115-*j* may be referred to as one or more receiving UEs (e.g., for unicast or groupcast or broadcast) supporting a single or multiple radio access technology, such as 5G NR, or both 4G LTE and 5G NR. The UE 115-*j*, the UE 115-*n*, or both, may represent one or more UEs supporting a single radio access technology such as 4G LTE (e.g., LTE UEs). The UE 115-1 may be referred to as a special UE. The special UE may be a group leader or a platoon leader in a V2X deployment, a cluster head, an RSU, a scheduling UE 115, or the like. In the following description of the process flow 500, operations between the UE 115-1, the UE 115-*k*, and the UE 115-*j* may occur in a different order or at different times than as shown. Some operations may also be omitted from the process flow 500, and other operations may be added to the process flow 500.

At 502, the UEs 115 (e.g., the UE 115-*j*, the UE 115-*k*, and the UE 115-1) may identify or receive co-channel configuration information. Co-channel information may include or indicate (e.g., via at least one sidelink parameter of the set of sidelink parameters) a set of component carriers supporting the co-channel operation associated with the first radio access technology (e.g., 4G LTE) and the second radio access technology (e.g., 5G NR). For example, the at least one sidelink parameter of the set of sidelink parameters may include an indication for co-channel operation (e.g., a bit indication may be set to a respective value, such as sl-nr-lte-cochannel is set to "1" for supporting co-channel operation). For example, the at least one sidelink parameter of the set of sidelink parameters may indicate sidelink NR carriers shared with LTE or LTE carriers shared with NR (e.g., sl-nr-lte-cochannel-carrier-list or sl-nr-lte-cochannel-carrier-combined-list). Additionally, or alternatively, the at least one sidelink parameter of the set of sidelink parameters may indicate sidelink NR carriers not shared with LTE or LTE carriers not shared with NR (e.g., sl-nr-lte-cochannel-carrier-block-list or sl-nr-lte-cochannel-carrier-combined-block-list). One or more of the UEs 115 may determine the set of component carriers supporting the co-channel operation associated with the first radio access technology (e.g., 4G LTE) and the second radio access technology (e.g., 5G NR) based at least in part on the at least one sidelink parameter of the set of sidelink parameters. In some examples, the at least one sidelink parameter of the set of sidelink parameters may indicate non-overlapped sidelink NR resource pools (e.g., sl-nr-pool-list) and sidelink LTE resource pools (e.g., sl-lte-pool-list). In some other examples, the at least one sidelink parameter of the set of sidelink parameters may indicate overlapped or shared sidelink NR-LTE co-channel pools (e.g., sl-nr-lte-co-channel-pool-list).

One or more of the UE 115-*j*, the UE 115-*k*, or the UE 115-1 may determine at least one of the set of sidelink resource pools based at least in part on the at least one sidelink parameter of the set of sidelink parameters. In some examples, the UEs 115 may identify, of the one or more sidelink parameters of the set of sidelink parameters, measurement and report parameters or instructions supporting co-channel operation. For example, SL-RSRP, CBR, NR penetration rate, or LTE penetration rate measurement configuration with sl-MeasConfigCommon (e.g., common configuration) or MeasConfigInfoToAddModList (e.g., UE dedicated configuration) and/or SL-RSRP or CBR or NR penetration rate or LTE penetration rate report with sl-ReportConfigCommon (e.g., common configuration) or sl-ReportConfigList (e.g., UE dedicated configuration) including EventTriggerConfig (e.g., for event trigger report) or PeriodicalReportConfig for periodic report, or both. In some examples (e.g., at 504), the UEs 115 may estimate or report channel availability parameter values (e.g., SL-RSRP or CBR or NR penetration rate or LTE penetration rate) according to a reporting or estimating configuration indicated in the co-channel configuration information identified at 502. Resource pools that support co-channel operations may be referred to as patterns of sidelink resources. The patterns of sidelink resources may define time intervals during which a UE 115 supporting NR communications (e.g., UE 115-k) may transmit NR packets using LTE resources on the co-channel. Thus, resource pools on the carriers that support NR-LTE co-channel operations may be defined by non-overlapped sidelink NR pools (e.g., as indicated in sl-nr-pool-list parameters) and sidelink LTE pools (e.g., as indicated in sl-lte-pool-list). Overlapped or shared sidelink NR-LTE co-channel pools may be defined via one or more parameters (e.g., sl-nr-lte-co-channel-pool-list).

In some examples, the co-channel configuration information may include an indication of a relationship between a set of channel availability parameter values and a set of patterns of sidelink resources. The channel availability parameter values may include channel quality status or channel busy ratios for the sidelink channel (e.g., for LTE communications or NR communications or both on the sidelink channel as part of the co-channel operation). The channel availability parameter values may include quality of service values for the sidelink communications (e.g., the priority associated with LTE communications, or the priority or reliability or latency associated with NR communications, or both). In some examples, the channel availability parameter values may include priority values (e.g., for a generated NR packet). For instance, some NR packets generated at 420 may be associated with higher priority transmissions (e.g., ultra-reliable low-latency communications (URLLC), emergency communications, or the like), and other NR packets may be associated with lower priority transmissions. The channel availability parameter values may include UE penetration rates (e.g., an NR penetration rate). An NR penetration rate, for example, may refer to a percentage of UEs 115 supporting NR capability in a wireless communications system 100. An NR penetration rate may be determined based on an indication (e.g., indicating an NR UE) in a MAC-CE message, or a sidelink control information message (SCI) (e.g., SCI or SCI2), or based on measurements (e.g., such as contention-based SL-RSRP or CBR measurement or decoding control channel (e.g., PSCCH with SCI part 1) or data channel (e.g., PSSCH with SCI part 2 or MAC CE) for an NR communication). Channel availability measurement parameters may be defined (e.g., in the configuration information) by one or more parameters, such as an NR penetration rate measurement configuration may be indicated via a parameter sl-measConfig (e.g., contained in sl-MeasConfigCommon or MeasConfigInfoToAddModList)) and an NR Penetration rate report may be indicated via sl-ReportConfig (e.g., contained in sl-ReportConfigCommon or sl-ReportConfigList), with eventtrigerconfig for event triggered report and/or PeriodicReportConfig for periodic report.

The pattern of sidelink resources may refer to resource pool patterns. For example, each bit of a bit map may indicate useable slots of a set of slots. The indicated slots of the set of slots may be time intervals during which the transmitting UE 115-k is permitted to utilize LTE resources for transmitting NR packets.

The relationship between the channel availability parameter values and the set of patterns of sidelink resources may define which pattern of sidelink resources the UE 115-k is permitted to use based on the channel availability parameter values. In some examples, the relationship may be defined in one or more lookup tables (LUTs). For instance, an LUT may define a relationship between NR penetration rates (e.g., a percentage or amount of UEs 115 that support or utilize NR communications) and patterns of sidelink resources, as illustrated with reference to table 1, as described with reference to FIG. 4.

In some examples, a LUT may be based on multiple channel availability parameters. For instance, the LUT may indicate different subsets of a first channel availability parameter (e.g., quality of service, SL-RSRP, CBR, or NR penetration rate) with reference to a second channel availability parameter (e.g., NR penetration rate, SL-RSRP, CBR, or quality of service). An example with NR penetration rates as the first channel availability parameter for different subsets and with quality of service as the second channel availability parameter for different entries of each subsets is illustrated with reference to table 2 above.

In some examples, each channel availability parameter may be mapped to one or more resource pool patterns, or each resource pool pattern may be mapped to one or more channel availability parameters. As described herein (e.g., at 524), a UE 115-1 may map one or more estimated or indicated channel availability parameters to a pattern of sidelink resources (e.g., according to a LUT indicated in the Co-Channel configuration at 402).

In some examples, the co-channel configuration information may be preconfigured, signalled, or any combination thereof. For example, the co-channel configuration information may be preconfigured or hardcoded at the UE 115-j, the UE 115-k, and the UE 115-1, and any other UEs 115. In some examples, the one or more parameter values of the co-channel configuration information may be included in one or more standards documents. In some examples, one or more UEs 115 may indicate the co-channel configuration information to each other (e.g., via RRC signalling, SCI or SCI2, or the like). In some examples, a base station 105 may indicate (e.g., via SIB, system information (SI), RRC configuration message, MAC CE or DCI activation or indication, or any combination) the co-channel configuration information to the UE 115-1 (e.g., via a Uu link while the UEs 115 are in the coverage area of the base station 105 or as part of a co-channel configuration). In some examples, a message (e.g., a sidelink message from another UE 115 or a downlink message from a base station 105, or the like) may activate or indicate (e.g., PC5 MAC CE or SCI by another UE via PC5 interface, or MAC CE or DCI by baste station 105 via Uu interface) preconfigured parameters included in the co-channel configuration information (e.g., that are configured, preconfigured or otherwise hardcoded at the UE 115).

According to some aspects of the process flow 500, at 506, the UE 115-*k* may estimate channel availability parameter values. For example, the UE 115-*k* may perform SL-RSRP or CBR measurement or UE estimation based on the measurement or UE detection. For example, the UE 115-*k* may estimate a UE penetration rate associated with the second radio access technology (e.g., NR penetration) based at least in part on UE measurement such as SL-RSRP or CBR associated to the first radio access technology (e.g., SL-RSRP or CBR measurement with LTE) and the second radio access technology (e.g., SL-RSRP or CBR measurement with NR) respectively or UE detection (e.g., an NR UE with an indication of supporting the second radio access technology, or an LTE UE without an indication of supporting the second radio access technology).

Additionally, or alternatively, the UE 115-*k* may determine a set of suitable resources associated with one or more the first radio access technology (e.g., 4G LTE) or the second radio access technology (e.g., 5G NR). The UE 115-*k* may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources. In some examples, the UE 115-*k* may monitor NR communications, or receive sidelink UE capability or sidelink UE assistance information message, or any combination thereof, from other UEs (e.g., UEs 115-*i*), to determine UE penetration rate as exemplified at 415. In some examples, the UE 115-*k* may measure SL-RSRP or CBR to determine either LTE resources or NR resources are used as the suitable resources as exemplified at 415.

Similarly, at 508, the UE 115-*j* may estimate channel availability parameter values (e.g., may perform SL-RSRP or CBR measurement and/or UE penetration rate estimation). For example, the UE 115-*j* may estimate a UE penetration rate associated with the second radio access technology (e.g., NR penetration rate) based at least in part on UE measurement or UE detection. Additionally, or alternatively, the UE 115-*j* may determine a set of suitable resources associated with one or more the first radio access technology (e.g., 4G LTE) or the second radio access technology (e.g., 5G NR). The UE 115-*j* may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources. In some examples, the UE 115-*j* may monitor NR communications, or receive sidelink UE capability or sidelink UE assistance information message, or any combination thereof, from other UEs (e.g., UEs 115-*i*), to determine UE penetration rate as exemplified at 415. In some examples, the UE 115-*j* may measure SL-RSRP or CBR to determine either LTE resources or NR resources are used as the suitable resources as exemplified at 415.

At 510, the UE 115-*k* may transmit a report to the UE 115-1. For example, the UE 115-*k* may transmit an indication of a set of channel availability parameter values (e.g., an UE penetration rate, a CBR or SL-RSRP for NR or LTE or both, a priority level, a QoS level, among other examples) indicating an amount of available sidelink radio frequency resources associated with one or more the first radio access technology (e.g., 4G LTE) or the second radio access technology (e.g., 5G NR). In some examples, the UE 115-*k* may transmit the report to the UE 115-1 via a sidelink control channel (e.g., via an SCI part 1 on PSCCH) or a sidelink shared channel (e.g., via an SCI part 2 or a PC5 MAC-CE on PSSCH) configured for reporting the set of channel availability parameter values for the co-channel operation, or a sidelink UE assistance information message or a PC5 RRC signaling message.

Similarly, at 512, the UE 115-*j* may transmit a report to the UE 115-1. For example, the UE 115-*j* may transmit an indication of a set of channel availability parameter values (e.g., an UE penetration rate, a CBR or SL-RSRP for NR or LTE or both, a priority level, a QoS level, among other examples) indicating an amount of available sidelink radio frequency resources associated with one or more the first radio access technology (e.g., 4G LTE) or the second radio access technology (e.g., 5G NR). In some examples, the UE 115-*j* may transmit the report to the UE 115-1 via a sidelink control channel (e.g., via an SCI part 1 on PSCCH) or a sidelink shared channel (e.g., via an SCI part 2 or a MAC-CE on PSSCH) configured for reporting the set of channel availability parameter values for the co-channel operation, or a sidelink UE assistance information message or a PC5 RRC signaling message.

In some examples, at 514, the UE 115-1 may receive one or more aggregated reports from one or more UEs 115 (e.g., the UE 115-*k* and the UE 115-*j*). According to some aspects of the process flow 500, at 516, the UE 115-*k* may estimate one or more channel availability parameter values (e.g., may perform SL-RSRP or CBR measurement and UE penetration rate estimation as described herein). Similarly, at 518, the UE 115-*j* may perform SL-RSRP or CBR measurement and UE penetration rate estimation as described herein.

At 520, the UE 115-*j* may transmit a report to the UE 115-*k* over a sidelink (e.g., a PC5 interface). For example, the UE 115-*j* may transmit an indication of a set of channel availability parameter values (e.g., an NR penetration rate, a SL-RSRP or CBR for NR or LTE or both, a priority level, a QoS level, among other examples) indicating an amount of available sidelink radio frequency resources associated with one or more the first radio access technology (e.g., 4G LTE) or the second radio access technology (e.g., 5G NR). The UE 115-*k* may aggregate the report received from the UEs 115-*j* with its own report (e.g., set of channel availability parameter values), or one or more additional reports received from one or more additional UEs, or both. The UE 115-*k* may transmit an aggregated report to the UE 115-1 via a PC5 interface. For example, at 522, the UE 115-*k* may transmit an indication of an aggregated set of channel availability parameter values associated with one or more the first radio access technology (e.g., 4G LTE) or the second radio access technology (e.g., 5G NR) via SCIs (e.g., multiple fields corresponding the received reports respectively), MAC CE(s) (e.g., multiple MAC CEs corresponding the received reports respectively or a MAC CE with multiple fields corresponding the received reports respectively), a sidelink UE assistance information message with a list of reports corresponding the received reports, or a PC5 RRC signaling message with a list of reports corresponding the received reports.

The UE 115-*k* may transmit the aggregated report to the UE 115-1 via a configured PSSCH (e.g., SCI part 2 or MAC CE). In some examples, the UE 115-*k* may transmit the aggregated report using multiple MAC-CEs for the multiple channel availability parameter values (e.g., SL-RSRP, CBR, UE penetration rate or a suitable resource, among other examples). As such, each MAC-CE of the multiple MAC-CEs may indicate a respective channel availability parameter value (e.g., NR penetration rate or a contention-based resource, among other examples). In some other examples, the UE 115-*k* may transmit the aggregated report using a single MAC-CE with multiple MAC-CE fields for the multiple channel availability parameter values (e.g., SL-RSRP, CBR, UE penetration rate or a suitable resource, among other examples). For example, each MAC-CE field indicating a respective channel availability parameter value (e.g., SL-RSRP, CBR, UE penetration rate or a suitable resource, among other examples).

In the example of FIG. 5, the UE 115-1 may enable dynamic co-channel operations for one or more of the UE 115-1, the UE 115-*k*, or the UE 115-*j* based at least in part on the estimated channel availability reported at 504 or 514 in the process flow 500.

At 528, the UE 115-1 may determine resources (e.g., LTE resources or NR resources) on which the UE 115-*k* is permitted to transmit an NR packet based at least in part on the estimated channel availability parameter values (e.g., as determined at 504 or 514 or additionally with current measurement or estimation). In some examples, the UE 115-1 may consider channel availability parameters such as an NR sidelink loading parameter value or LTE sidelink loading parameter value.

At 530, the UE 115-1 may select sidelink resource pool pattern based on mapping the channel availability parameter value to a LUT (e.g., table 1 or table 2, or the like). For instance, if table 1 is configured in the co-channel configuration information, and the estimated channel availability parameter is an NR penetration rate of 90%, then the UE 115-1 may select pool-pattern_1. Pool-pattern_1 may define a pattern of time resources (e.g., slots) during which the UE 115-1 is permitted to utilize LTE resources for transmitting the NR packet. In some examples, the UE 115-1 may determine into what range of channel availability parameter values an estimated channel availability parameter value falls. For instance, if the channel availability parameter is 94%, the co-channel configuration information may instruct the UE 115-1 to select pool-pattern_0 (e.g., pool-pattern_0 applies to an NR penetration rate that is above 90% and up to 100%, while pool-patter_1 applies to an NR penetration rate that is above 80% and up to 90%, etc. Such ranges may apply to any channel availability parameter value.

In some examples, the UE 115-1 may consider multiple channel availability parameter values to select the pattern of sidelink resources. For instance, if table 2 is configured in the co-channel configuration information, and the UE 115-1 estimates an NR rate of 100% and a QoS of 4, then the 115-1 may select Pool-Patterns_1. LUTs (e.g., such as table 2) may be configured in the co-channel configuration information to include any number of columns representing any number of or combination of channel availability parameter values. At 534, the UE 115-1 may transmit, to the UEs 115 in proximity (e.g., to a UE 115-*k* that transmits an estimated channel availability parameter value or an aggregated channel availability parameter report at 504 or 514), an indication of a sidelink resource pattern. The indication may be a PC5 MAC-CE, or an SCI, or the like, for activating a sidelink resource pool pattern. For instance, the UE 115-1 may transmit, to the UEs 115, an indication of the resource pool pattern selected at 530. The UE 115-*k* may indicate the selected pattern of sidelink resources (e.g., using sidelink resource pattern index or the code point in the LUT table configured in the co-channel configuration information). In some examples, the UE 115-1 may be capable of supporting both NR communications and LTE communications. In some examples, the UE 115-1 may only support either LTE communications or NR communications. The transmission from the UE 115-1 received by the UE 115-*k* at 534 may activate the resource of the selected pattern of sidelink resources (e.g., may indicate during which slots the UE 115-*k* is permitted to utilize LTE resources for transmitting NR packets). In some examples, the UE 115-*k* may forward the received MAC CE or SCI activating sidelink resource pattern to the UE 115-*j*.

In some examples, the UE 115-1 may determine an update to a LUT (e.g., the mapping between channel availability parameter values and resource pool patterns) based on system loading, channel measurement (SL-RSRP or CBR), or estimated UE penetration rate, jointly with the channel availability parameter values received from UEs 115 (e.g., reported at 510, 512 and/or 522). In such cases, the UE 115-1 may start PC5 RRC reconfiguration procedure with UEs 115 in proximity (e.g., sending RRCReconfigurationSidelink with the update LUT in the co-channel configuration information to UEs 115). In some examples, the UE 115-*k* may forward the received configuration to UEs 115-*j* (e.g., using an RRCReconfigurationSidelink to a UE 115-*j*, a PC5 RRC group message to a group of UEs 115-*j*, or a PC5 RRC common message to all UEs 115-*j* in proximity). UEs 115 may respond with RRCReconfigurationCompleteSidelink to UE 115-1 or UE 115-*k* to complete the PC5 RRC reconfiguration procedure.

In some examples, at 536, the UE 115-*k* may identify an NR packet for transmission, and may transmit the NR packet to the UE 115-*j* using one or more of the LTE sidelink resources activated at 534. In some examples, at 538, the UE 115-*k* may transmit (e.g., to the UE 115-*m*) an indication of sidelink resources. For instance, the UE 115-*k* may transmit, to the UE 115-*m*, an indication of which sidelink resources the NR packet is to be transmitted on (e.g., at 536). In some examples, the UE 115-*k* may transmit an indication of the selected pattern of sidelink resources (e.g., using a code point indicated in the first column of table 1 or table 2). In some examples, the UE 115-*k* may transmit an indication of one or more reserved sidelink resources (e.g., which may be a subset of an activated pattern of sidelink resources indicated at 534). The indication may be included in an SCI associated with the first radio access technology (e.g., LTE SCI).

Figure 6:
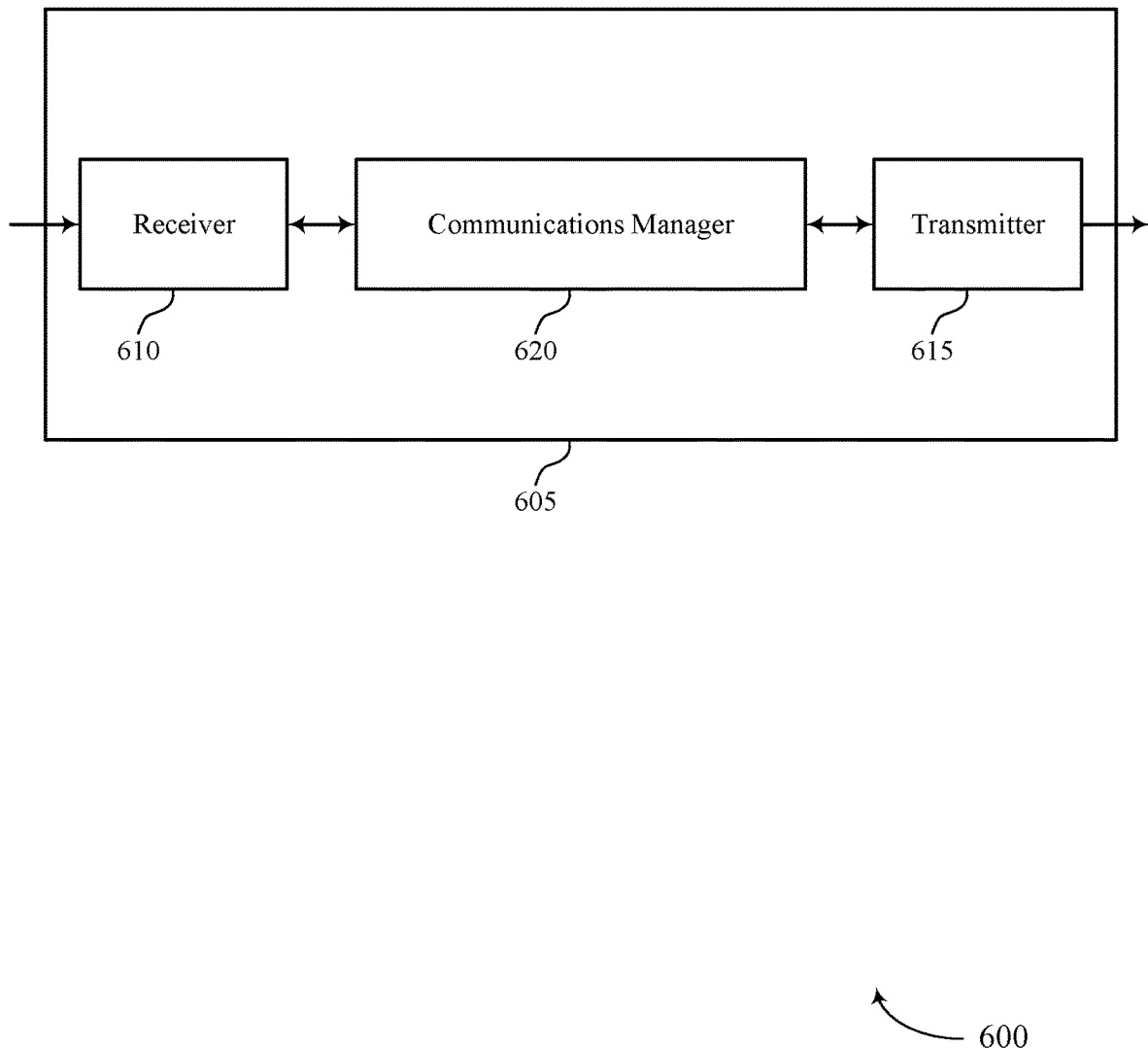
FIGS. 6 and 7 show block diagrams of devices that support autonomous co-channel operations in accordance with aspects of the present disclosure.

FIG. 6 shows a block diagram 600 of a device 605 that supports autonomous co-channel operations in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to autonomous co-channel operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to autonomous co-channel operations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of autonomous co-channel operations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The communications manager 620 may be configured as or otherwise support a means for estimating one or more channel availability parameter values indicating an amount of available sidelink radio frequency resources associated with the first radio access technology, the second radio access technology, or both. The communications manager 620 may be configured as or otherwise support a means for selecting a pattern of sidelink resources associated with the first radio access technology based on a co-channel configuration and the estimated one or more channel availability parameter values. The communications manager 620 may be configured as or otherwise support a means for communicating on the set of sidelink resources according to the selected pattern of sidelink resources.

Additionally, or alternatively, the communications manager 620 may support wireless communications at a second UE in accordance with examples as disclosed herein. For example, the communications manager 620 may be configured as or otherwise support a means for receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The communications manager 620 may be configured as or otherwise support a means for receiving a report message from a first UE, the report message including an indication of a set of channel availability parameter values indicating an amount of available sidelink radio frequency resources associated with the first radio access technology, the second radio access technology, or both. The communications manager 620 may be configured as or otherwise support a means for selecting a pattern of sidelink resources associated with the first radio access technology based on a co-channel configuration and the estimated one or more channel availability parameter values. The communications manager 620 may be configured as or otherwise support a means for transmitting, to the first UE, an indication of the pattern of sidelink resources associated with the one or more channel availability parameter values for communication by the first UE according to the pattern of sidelink resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for autonomous co-channel operations that may result in more efficient use of available resources, decreased system latency, and improved user experience.

Figure 7:
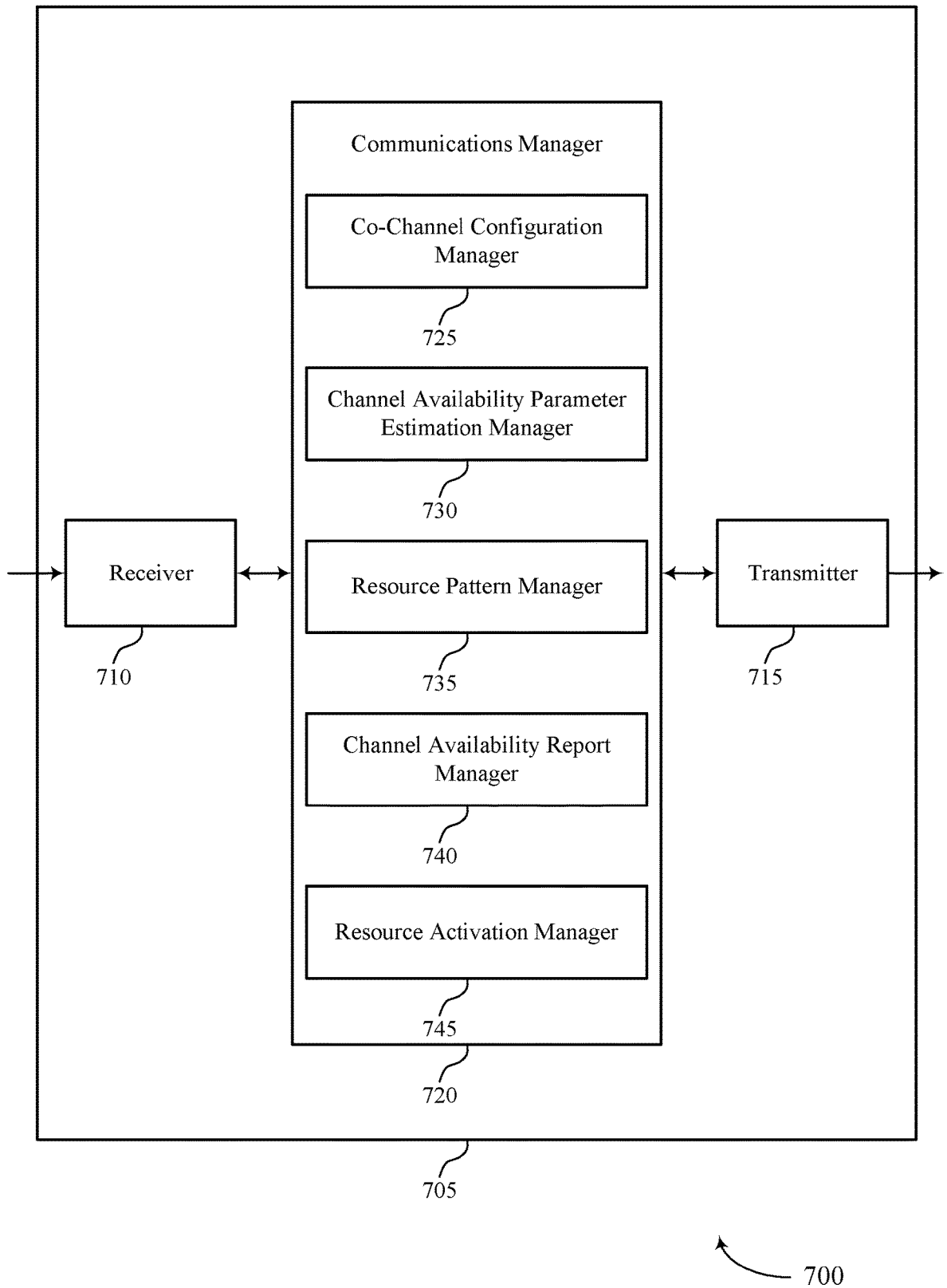

FIG. 7 shows a block diagram 700 of a device 705 that supports autonomous co-channel operations in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to autonomous co-channel operations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to autonomous co-channel operations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of autonomous co-channel operations as described herein. For example, the communications manager 720 may include a co-channel configuration manager 725, a channel availability parameter estimation manager 730, a resource pattern manager 735, a channel availability report manager 740, a resource activation manager 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The co-channel configuration manager 725 may be configured as or otherwise support a means for receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The channel availability parameter estimation manager 730 may be configured as or otherwise support a means for estimating one or more channel availability parameter values indicating an amount of available sidelink radio frequency resources associated with the first radio access technology, the second radio access technology, or both. The resource pattern manager 735 may be configured as or otherwise support a means for selecting a pattern of sidelink resources associated with the first radio access technology based on a co-channel configuration and the estimated one or more channel availability parameter values. The resource pattern manager 735 may be configured as or otherwise support a means for communicating on the set of sidelink resources according to the selected pattern of sidelink resources.

Additionally, or alternatively, the communications manager 720 may support wireless communications at a second UE in accordance with examples as disclosed herein. The co-channel configuration manager 725 may be configured as or otherwise support a means for receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The channel availability report manager 740 may be configured as or otherwise support a means for receiving a report message from a first UE, the report message including an indication of a set of channel availability parameter values indicating an amount of available sidelink radio frequency resources associated with the first radio access technology, the second radio access technology, or both. The resource pattern manager 735 may be configured as or otherwise support a means for selecting a pattern of sidelink resources associated with the first radio access technology based on a co-channel configuration and the estimated one or more channel availability parameter values. The resource activation manager 745 may be configured as or otherwise support a means for transmitting, to the first UE, an indication of the pattern of sidelink resources associated with the one or more channel availability parameter values for communication by the first UE according to the pattern of sidelink resources.

Figure 8:
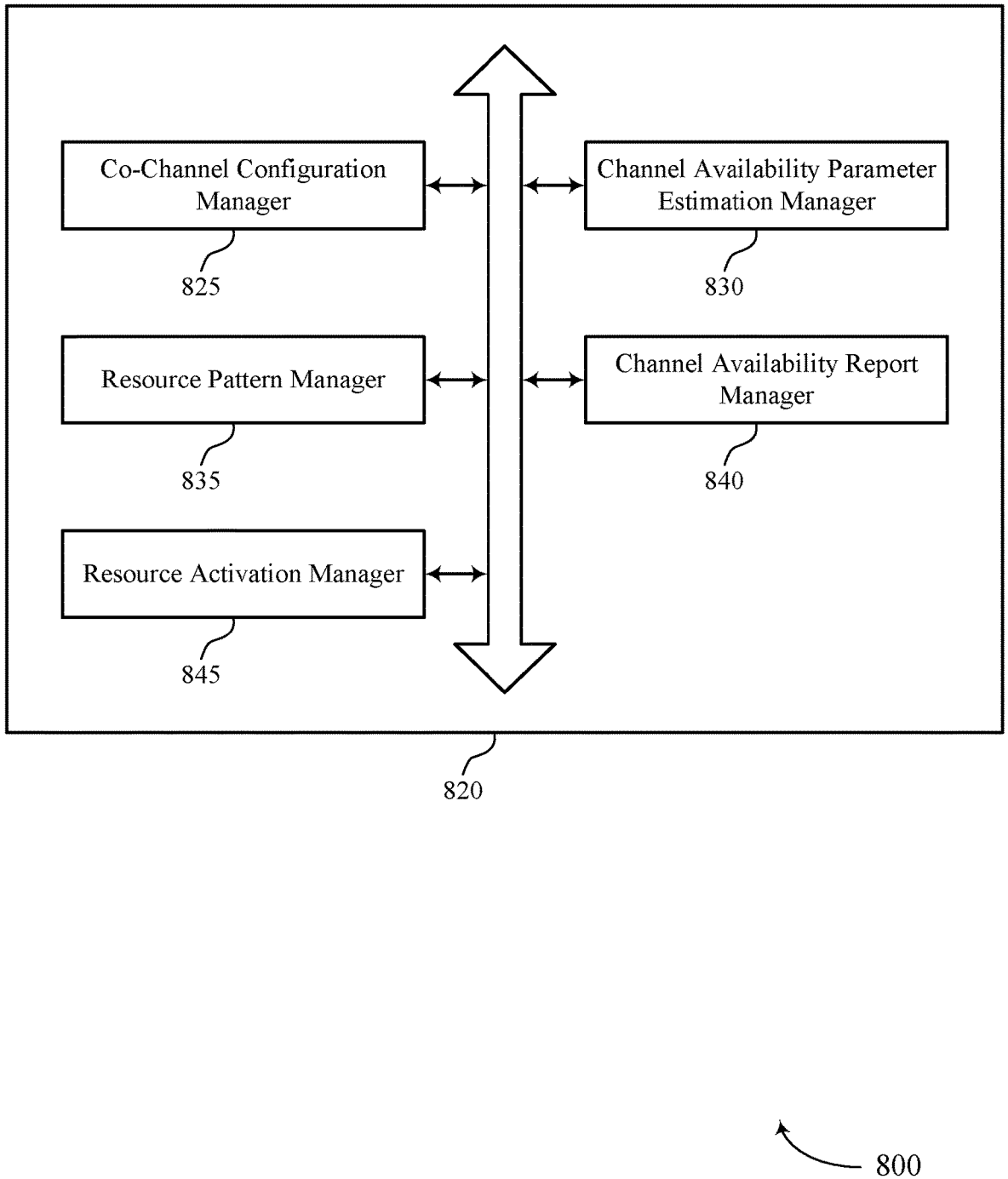
FIG. 8 shows a block diagram of a communications manager that supports autonomous co-channel operations in accordance with aspects of the present disclosure.

FIG. 8 shows a block diagram 800 of a communications manager 820 that supports autonomous co-channel operations in accordance with aspects of the present disclosure. The communications manager 820 may be an example of aspects of a communications manager 620, a communications manager 720, or both, as described herein. The communications manager 820, or various components thereof, may be an example of means for performing various aspects of autonomous co-channel operations as described herein. For example, the communications manager 820 may include a co-channel configuration manager 825, a channel availability parameter estimation manager 830, a resource pattern manager 835, a channel availability report manager 840, a resource activation manager 845, or any combination thereof. Each of these components may communicate, directly or indirectly, with one another (e.g., via one or more buses).

The communications manager 820 may support wireless communications at a first UE in accordance with examples as disclosed herein. The co-channel configuration manager 825 may be configured as or otherwise support a means for receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The channel availability parameter estimation manager 830 may be configured as or otherwise support a means for estimating one or more channel availability parameter values indicating an amount of available sidelink radio frequency resources associated with the first radio access technology, the second radio access technology, or both. The resource pattern manager 835 may be configured as or otherwise support a means for selecting a pattern of sidelink resources associated with the first radio access technology based on a co-channel configuration and the estimated one or more channel availability parameter values. In some examples, the resource pattern manager 835 may be configured as or otherwise support a means for communicating on the set of sidelink resources according to the selected pattern of sidelink resources.

In some examples, the co-channel configuration manager 825 may be configured as or otherwise support a means for identifying, in the co-channel configuration, an indication of a relationship between a set of channel availability parameter values and a set of patterns of sidelink resources, where each pattern of sidelink resources of the set of patterns of sidelink resources is associated with at least one channel availability parameter value.

In some examples, the resource pattern manager 835 may be configured as or otherwise support a means for mapping the estimated one or more channel availability parameter values to the set of channel availability parameter values. In some examples, the resource pattern manager 835 may be configured as or otherwise support a means for identifying the pattern of sidelink resources from the set of patterns of sidelink resources that is associated with the estimated one or more channel availability parameter values based on the mapping. In some examples, the resource pattern manager 835 may be configured as or otherwise support a means for selecting the pattern of sidelink resources based on identifying the pattern of sidelink resources from the set of patterns of sidelink resources.

In some examples, the indication of the relationship includes a lookup table.

In some examples, the channel availability parameter value includes an indication of quality of service, a priority level, a channel busy ratio, a penetration rate associated with the first radio access technology, the second radio access technology, or both, or any combination thereof.

In some examples, the penetration rate includes an amount of UEs of a set of UEs operating according to the second radio access technology.

In some examples, the co-channel configuration manager 825 may be configured as or otherwise support a means for determining a set of component carriers supporting the co-channel operations based on at least one sidelink parameter of the set of sidelink parameters, where the set of component carriers includes one or more of a first subset of component carriers associated with the first radio access technology indicated as shareable or un-sharable with the second radio access technology.

In some examples, the co-channel configuration manager 825 may be configured as or otherwise support a means for determining a set of sidelink resource pools based on the determined set of component carriers, where the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

In some examples, to support estimating the one or more channel availability parameter values, the channel availability parameter estimation manager 830 may be configured as or otherwise support a means for performing one or more measurements on radio frequency resources associated with the first radio access technology for co-channel operation. In some examples, to support estimating the one or more channel availability parameter values, the channel availability parameter estimation manager 830 may be configured as or otherwise support a means for detecting operations on radio frequency resources associated with the first radio access technology for the co-channel by devices using the first radio access technology, devices using the second radio access technology, or both.

In some examples, to support estimating the one or more channel availability parameter values, the channel availability report manager 840 may be configured as or otherwise support a means for receiving, from one or more additional UEs, channel availability report messages including channel availability parameter values. In some examples, to support estimating the one or more channel availability parameter values, the channel availability report manager 840 may be configured as or otherwise support a means for aggregating the received channel availability parameter values. In some examples, to support estimating the one or more channel availability parameter values, the channel availability report manager 840 may be configured as or otherwise support a means for determining the one or more channel availability parameter values based on the aggregating.

Additionally, or alternatively, the communications manager 820 may support wireless communications at a second UE in accordance with examples as disclosed herein. In some examples, the co-channel configuration manager 825 may be configured as or otherwise support a means for receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The channel availability report manager 840 may be configured as or otherwise support a means for receiving a report message from a first UE, the report message including an indication of a set of channel availability parameter values indicating an amount of available sidelink radio frequency resources associated with the first radio access technology, the second radio access technology, or both. In some examples, the resource pattern manager 835 may be configured as or otherwise support a means for selecting a pattern of sidelink resources associated with the first radio access technology based on a co-channel configuration and the estimated one or more channel availability parameter values. The resource activation manager 845 may be configured as or otherwise support a means for transmitting, to the first UE, an indication of the pattern of sidelink resources associated with the one or more channel availability parameter values for communication by the first UE according to the pattern of sidelink resources.

In some examples, the co-channel configuration manager 825 may be configured as or otherwise support a means for identifying, in the co-channel configuration, an indication of a relationship between a set of channel availability parameter values and a set of patterns of sidelink resources, where each pattern of sidelink resources of the set of patterns of sidelink resources is associated with at least one channel availability parameter value.

In some examples, the resource pattern manager 835 may be configured as or otherwise support a means for mapping the estimated one or more channel availability parameter values to the set of channel availability parameter values. In some examples, the resource pattern manager 835 may be configured as or otherwise support a means for identifying the pattern of sidelink resources from the set of patterns of sidelink resources that is associated with the one or more channel availability parameter values based on the mapping. In some examples, the resource pattern manager 835 may be configured as or otherwise support a means for selecting the pattern of sidelink resources based on identifying the pattern of sidelink resources from the set of patterns of sidelink resources.

In some examples, the indication of the relationship includes a lookup table.

In some examples, the channel availability parameter value includes an indication of quality of service, a priority level, a channel busy ratio, a penetration rate associated with the first radio access technology, the second radio access technology, or both, or any combination thereof.

In some examples, to support receiving the report message, the channel availability report manager 840 may be configured as or otherwise support a means for receiving, on a sidelink control channel or sidelink shared channel, a set of MAC control elements (CEs), each MAC-CE associated with one of the set of channel availability parameter values, where each of the channel availability parameter values is associated with a respective UE of a set of UEs including the set of UEs.

In some examples, to support receiving the report message, the channel availability report manager 840 may be configured as or otherwise support a means for receiving, on a sidelink control channel or sidelink shared channel, a MAC control element (CE) including a set of fields, where each field of the set of fields includes an indication of a channel availability parameter value of the set of channel availability parameter values, where each of the channel availability parameter values is associated with a respective UE of a set of UEs including the set of UEs.

In some examples, the availability report manager 840 may be configured as or otherwise support a means for determining a set of component carriers supporting the co-channel operations based on at least one sidelink parameter of the set of sidelink parameters, where the set of component carriers includes one or more of a first subset of component carriers associated with the first radio access technology indicated as shareable or un-sharable with the second radio access technology.

In some examples, the availability report manager 840 may be configured as or otherwise support a means for determining a set of sidelink resource pools based on the determined set of component carriers, where the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

Figure 9:
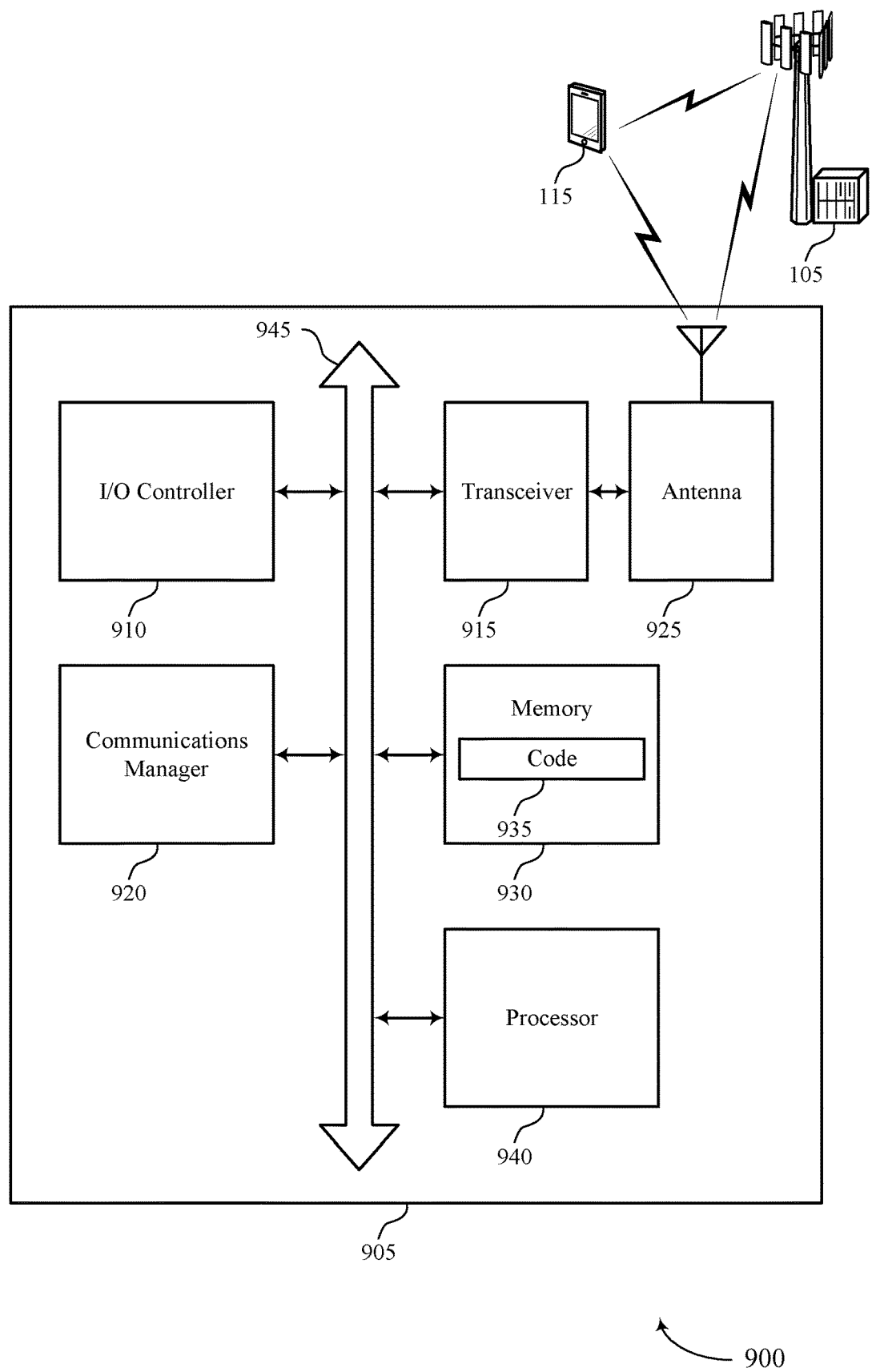
FIG. 9 shows a diagram of a system including a device that supports autonomous co-channel operations in accordance with aspects of the present disclosure.

FIG. 9 shows a diagram of a system 900 including a device 905 that supports autonomous co-channel operations in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting autonomous co-channel operations). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The communications manager 920 may be configured as or otherwise support a means for estimating one or more channel availability parameter values indicating an amount of available sidelink radio frequency resources associated with the first radio access technology, the second radio access technology, or both. The communications manager 920 may be configured as or otherwise support a means for selecting a pattern of sidelink resources associated with the first radio access technology based on a co-channel configuration and the estimated one or more channel availability parameter values. The communications manager 920 may be configured as or otherwise support a means for communicating on the set of sidelink resources according to the selected pattern of sidelink resources.

Additionally, or alternatively, the communications manager 920 may support wireless communications at a second UE in accordance with examples as disclosed herein. For example, the communications manager 920 may be configured as or otherwise support a means for receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The communications manager 920 may be configured as or otherwise support a means for receiving a report message from a first UE, the report message including an indication of a set of channel availability parameter values indicating an amount of available sidelink radio frequency resources associated with the first radio access technology, the second radio access technology, or both. The communications manager 920 may be configured as or otherwise support a means for selecting a pattern of sidelink resources associated with the first radio access technology based on a co-channel configuration and the estimated one or more channel availability parameter values. The communications manager 920 may be configured as or otherwise support a means for transmitting, to the first UE, an indication of the pattern of sidelink resources associated with the one or more channel availability parameter values for communication by the first UE according to the pattern of sidelink resources.

By including or configuring the communications manager 920 in accordance with examples as described herein, the device 905 may support techniques for autonomous co-channel operations that may result in more efficient use of available resources, decreased system latency, and improved user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of autonomous co-channel operations as described herein, or the processor 940 and the memory 930 may be otherwise configured to perform or support such operations.

Figure 10:
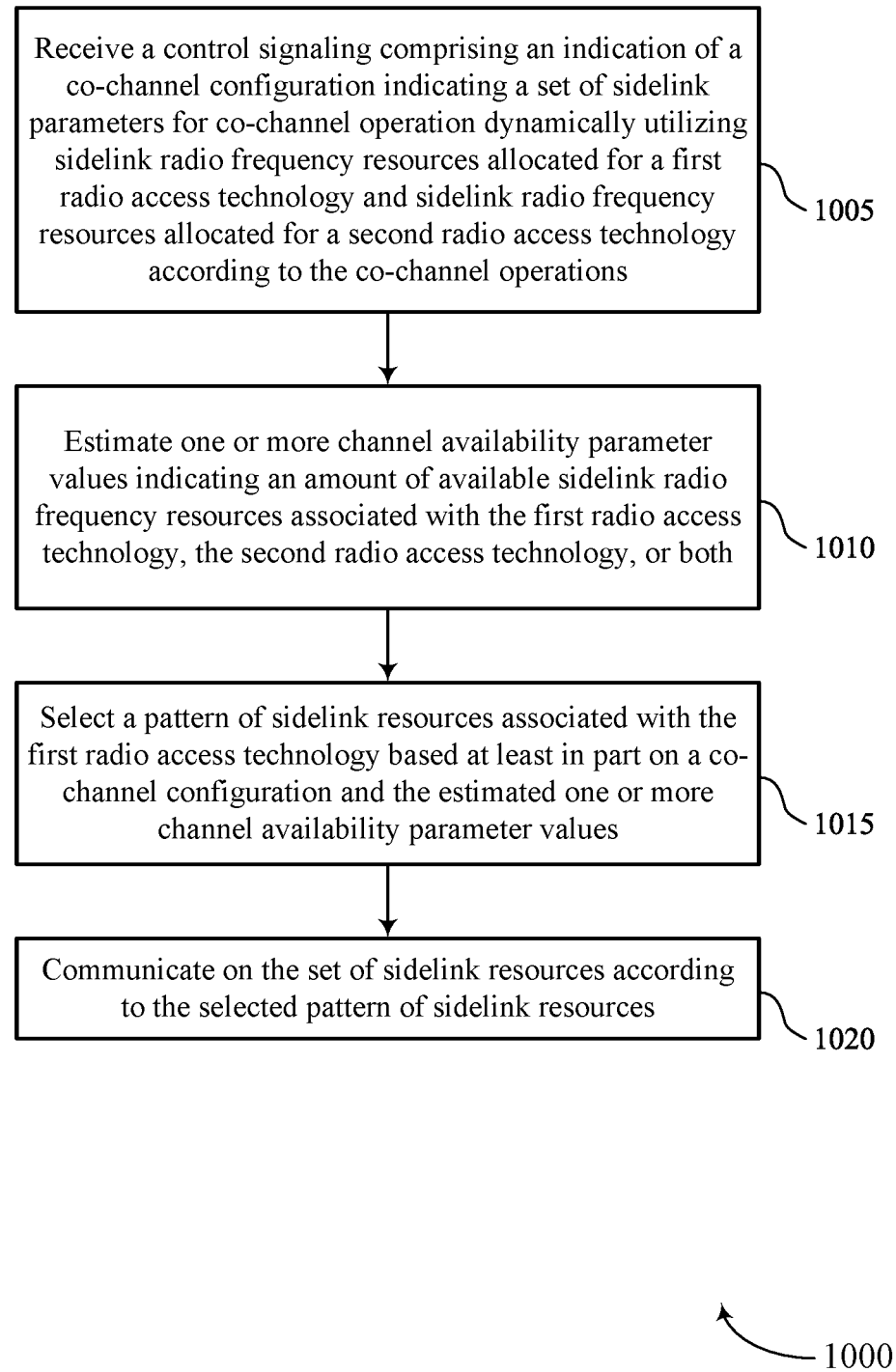
FIGS. 10 through 13 show flowcharts illustrating methods that support autonomous co-channel operations in accordance with aspects of the present disclosure.

FIG. 10 shows a flowchart illustrating a method 1000 that supports autonomous co-channel operations in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The operations of 1005 may be performed in accordance with examples as disclosed herein. In some examples, aspects of the operations of 1005 may be performed by a co-channel configuration manager 825 as described with reference to FIG. 8.

At 1010, the method may include estimating one or more channel availability parameter values indicating an amount of available sidelink radio frequency resources associated with the first radio access technology, the second radio access technology, or both. The operations of 1010 may be performed in accordance with examples as disclosed herein. In some examples, aspects of the operations of 1010 may be performed by a channel availability parameter estimation manager 830 as described with reference to FIG. 8.

At 1015, the method may include selecting a pattern of sidelink resources associated with the first radio access technology based on a co-channel configuration and the estimated one or more channel availability parameter values. The operations of 1015 may be performed in accordance with examples as disclosed herein. In some examples, aspects of the operations of 1015 may be performed by a resource pattern manager 835 as described with reference to FIG. 8.

At 1020, the method may include communicating on the set of sidelink resources according to the selected pattern of sidelink resources. The operations of 1020 may be performed in accordance with examples as disclosed herein. In some examples, aspects of the operations of 1020 may be performed by a resource pattern manager 835 as described with reference to FIG. 8.

Figure 11:
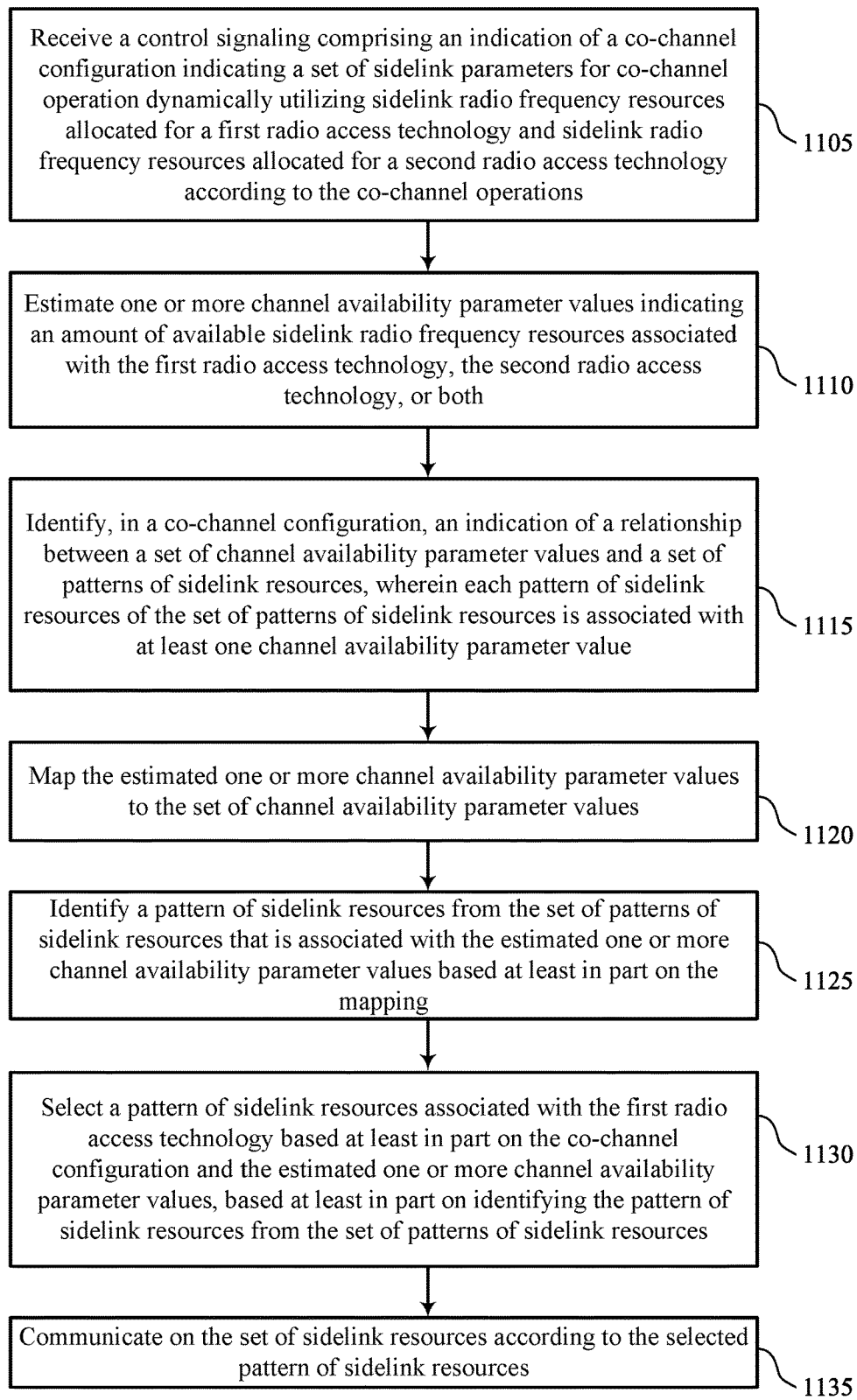

FIG. 11 shows a flowchart illustrating a method 1100 that supports autonomous co-channel operations in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving a control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The operations of 1105 may be performed in accordance with examples as disclosed herein. In some examples, aspects of the operations of 1105 may be performed by a co-channel configuration manager 825 as described with reference to FIG. 8.

At 1110, the method may include estimating one or more channel availability parameter values indicating an amount of available sidelink radio frequency resources associated with the first radio access technology, the second radio access technology, or both. The operations of 1110 may be performed in accordance with examples as disclosed herein. In some examples, aspects of the operations of 1110 may be performed by a channel availability parameter estimation manager 830 as described with reference to FIG. 8.

At 1115, the method may include identifying, in a co-channel configuration, an indication of a relationship between a set of channel availability parameter values and a set of patterns of sidelink resources, where each pattern of sidelink resources of the set of patterns of sidelink resources is associated with at least one channel availability parameter value. The operations of 1115 may be performed in accordance with examples as disclosed herein. In some examples, aspects of the operations of 1115 may be performed by a co-channel configuration manager 825 as described with reference to FIG. 8.

At 1120, the method may include mapping the estimated one or more channel availability parameter values to the set of channel availability parameter values. The operations of 1120 may be performed in accordance with examples as disclosed herein. In some examples, aspects of the operations of 1120 may be performed by a resource pattern manager 835 as described with reference to FIG. 8.

At 1125, the method may include identifying a pattern of sidelink resources from the set of patterns of sidelink resources that is associated with the estimated one or more channel availability parameter values based on the mapping. The operations of 1125 may be performed in accordance with examples as disclosed herein. In some examples, aspects of the operations of 1125 may be performed by a resource pattern manager 835 as described with reference to FIG. 8.

At 1130, the method may include selecting a pattern of sidelink resources associated with the first radio access technology based on the co-channel configuration and the estimated one or more channel availability parameter values based at least in part on identifying the pattern of sidelink resources from the set of patterns of sidelink resources. The operations of 1130 may be performed in accordance with examples as disclosed herein. In some examples, aspects of the operations of 1130 may be performed by a resource pattern manager 835 as described with reference to FIG. 8.

At 1135, the method may include communicating on the set of sidelink resources according to the selected pattern of sidelink resources. The operations of 1135 may be performed in accordance with examples as disclosed herein. In some examples, aspects of the operations of 1135 may be performed by a resource pattern manager 835 as described with reference to FIG. 8.

Figure 12:
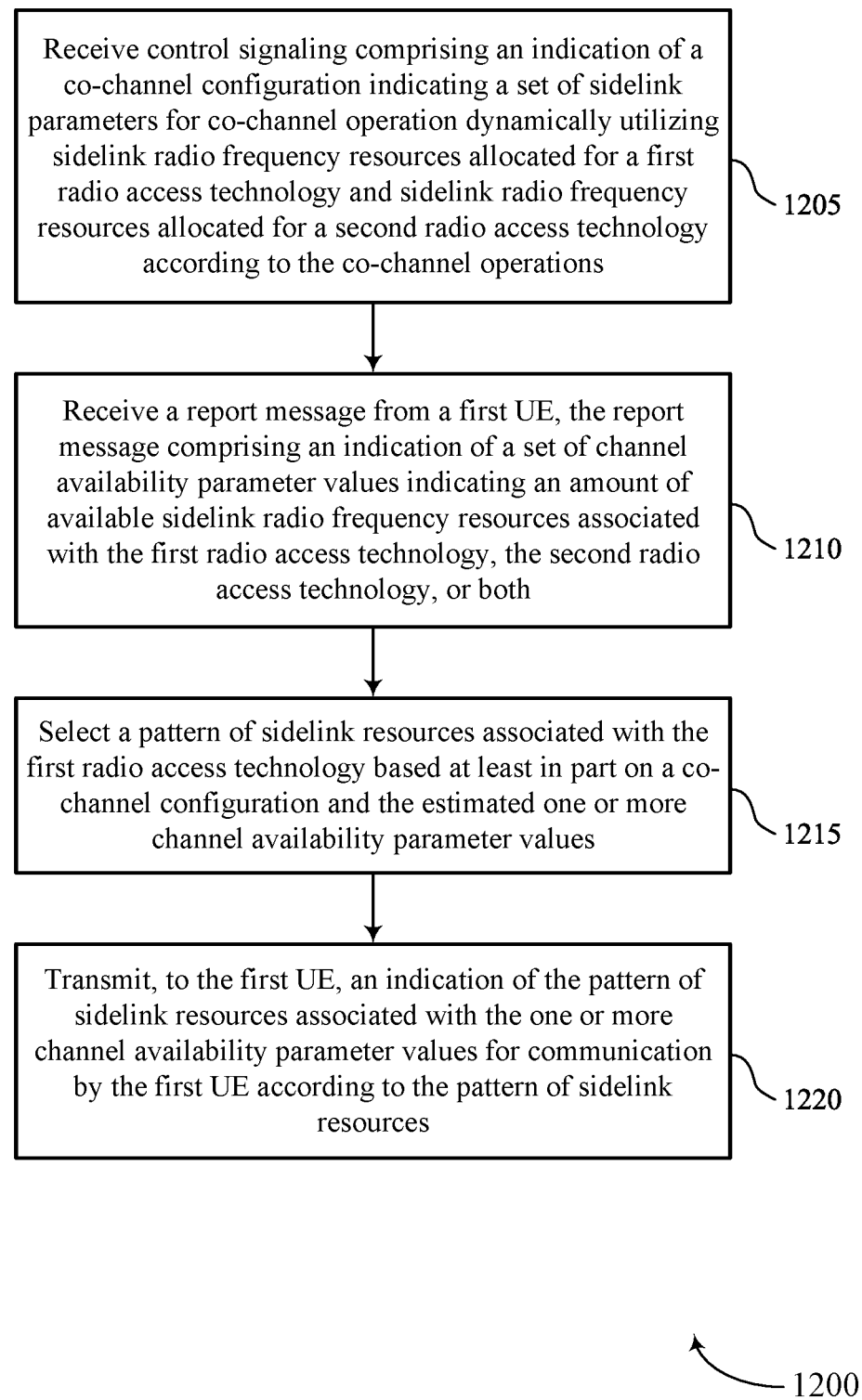

FIG. 12 shows a flowchart illustrating a method 1200 that supports autonomous co-channel operations in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The operations of 1205 may be performed in accordance with examples as disclosed herein. In some examples, aspects of the operations of 1205 may be performed by a co-channel configuration manager 825 as described with reference to FIG. 8.

At 1210, the method may include receiving a report message from a first UE (e.g., special UE), the report message including an indication of a set of channel availability parameter values indicating an amount of available sidelink radio frequency resources associated with the first radio access technology, the second radio access technology, or both. The operations of 1210 may be performed in accordance with examples as disclosed herein. In some examples, aspects of the operations of 1210 may be performed by a channel availability report manager 840 as described with reference to FIG. 8.

At 1215, the method may include selecting a pattern of sidelink resources associated with the first radio access technology based on a co-channel configuration and the estimated one or more channel availability parameter values (e.g., based at least in part on the report received at 1210). The operations of 1215 may be performed in accordance with examples as disclosed herein. In some examples, aspects of the operations of 1215 may be performed by a resource pattern manager 835 as described with reference to FIG. 8.

At 1220, the method may include transmitting, to the first UE, an indication of the pattern of sidelink resources associated with the one or more channel availability parameter values for communication by the first UE according to the pattern of sidelink resources. The operations of 1220 may be performed in accordance with examples as disclosed herein. In some examples, aspects of the operations of 1220 may be performed by a resource activation manager 845 as described with reference to FIG. 8.

Figure 13:
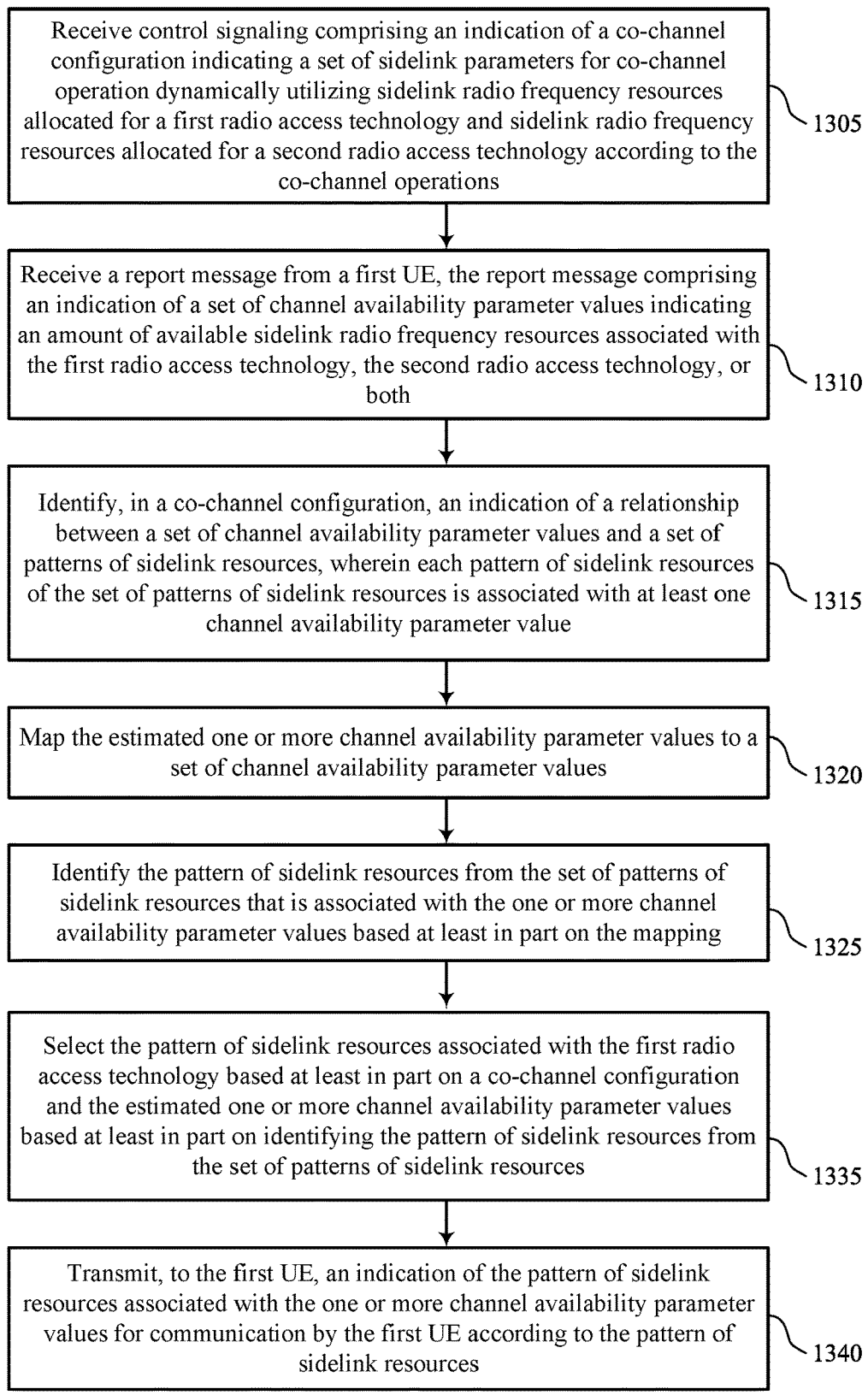

FIG. 13 shows a flowchart illustrating a method 1300 that supports autonomous co-channel operations in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving control signaling including an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations. The operations of 1305 may be performed in accordance with examples as disclosed herein. In some examples, aspects of the operations of 1305 may be performed by a co-channel configuration manager 825 as described with reference to FIG. 8.

At 1310, the method may include receiving a report message from a first UE (e.g., a special UE), the report message including an indication of a set of channel availability parameter values indicating an amount of available sidelink radio frequency resources associated with the first radio access technology, the second radio access technology, or both. The operations of 1310 may be performed in accordance with examples as disclosed herein. In some examples, aspects of the operations of 1310 may be performed by a channel availability report manager 840 as described with reference to FIG. 8.

At 1315, the method may include identifying, in a co-channel configuration, an indication of a relationship between a set of channel availability parameter values and a set of patterns of sidelink resources, where each pattern of sidelink resources of the set of patterns of sidelink resources is associated with at least one channel availability parameter value. The operations of 1315 may be performed in accordance with examples as disclosed herein. In some examples, aspects of the operations of 1315 may be performed by a co-channel configuration manager 825 as described with reference to FIG. 8.

At 1320, the method may include mapping the estimated one or more channel availability parameter values to a set of channel availability parameter values. The operations of 1320 may be performed in accordance with examples as disclosed herein. In some examples, aspects of the operations of 1320 may be performed by a resource pattern manager 835 as described with reference to FIG. 8.

At 1325, the method may include identifying the pattern of sidelink resources from the set of patterns of sidelink resources that is associated with the one or more channel availability parameter values based on the mapping. The operations of 1325 may be performed in accordance with examples as disclosed herein. In some examples, aspects of the operations of 1325 may be performed by a resource pattern manager 835 as described with reference to FIG. 8.

At 1330, the method may include selecting the pattern of sidelink resources associated with the first radio access technology based on a co-channel configuration and the estimated one or more channel availability parameter values based at least in part on identifying the pattern of sidelink resources from the set of patterns of sidelink resources. The operations of 1330 may be performed in accordance with examples as disclosed herein. In some examples, aspects of the operations of 1330 may be performed by a resource pattern manager 835 as described with reference to FIG. 8.

At 1335, the method may include transmitting, to the first UE, an indication of the pattern of sidelink resources associated with the one or more channel availability parameter values for communication by the first UE according to the pattern of sidelink resources. The operations of 1335 may be performed in accordance with examples as disclosed herein. In some examples, aspects of the operations of 1335 may be performed by a resource activation manager 845 as described with reference to FIG. 8.

Aspect 1: A method for wireless communications at a first UE, comprising: receiving a control signaling comprising an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations; estimating one or more channel availability parameter values indicating an amount of available sidelink radio frequency resources associated with the first radio access technology, the second radio access technology, or both; selecting a pattern of sidelink resources associated with the first radio access technology based at least in part on a co-channel configuration and the estimated one or more channel availability parameter values; and communicating on the set of sidelink resources according to the selected pattern of sidelink resources.

Aspect 2: The method of aspect 1, further comprising: identifying, in the co-channel configuration, an indication of a relationship between a set of channel availability parameter values and a set of patterns of sidelink resources, wherein each pattern of sidelink resources of the set of patterns of sidelink resources is associated with at least one channel availability parameter value.

Aspect 3: The method of aspect 2, further comprising: mapping the estimated one or more channel availability parameter values to the set of channel availability parameter values; identifying the pattern of sidelink resources from the set of patterns of sidelink resources that is associated with the estimated one or more channel availability parameter values based at least in part on the mapping; and selecting the pattern of sidelink resources based at least in part on identifying the pattern of sidelink resources from the set of patterns of sidelink resources.

Aspect 4: The method of any of aspects 2 through 3, wherein the indication of the relationship comprises a lookup table.

Aspect 5: The method of any of aspects 2 through 4, wherein the channel availability parameter value comprises an indication of quality of service, a priority level, a channel busy ratio, a penetration rate associated with the first radio access technology, the second radio access technology, or both, or any combination thereof.

Aspect 6: The method of any of aspects 1 through 5, wherein the penetration rate comprises an amount of UEs of a set of UEs operating according to the second radio access technology.

Aspect 7: The method of any of aspects 1 through 6, further comprising: determining a set of component carriers supporting the co-channel operations based at least in part on at least one sidelink parameter of the set of sidelink parameters, wherein the set of component carriers includes one or more of a first subset of component carriers associated with the first radio access technology indicated as shareable or un-sharable with the second radio access technology.

Aspect 8: The method of aspect 7, further comprising: determining a set of sidelink resource pools based at least in part on the determined set of component carriers, wherein the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

Aspect 9: The method of any of aspects 1 through 8, wherein estimating the one or more channel availability parameter values comprises: performing one or more measurements on radio frequency resources associated with the first radio access technology for co-channel operation; or detecting operations on radio frequency resources associated with the first radio access technology for the co-channel by devices using the first radio access technology, devices using the second radio access technology, or both.

Aspect 10: The method of any of aspects 1 through 9, wherein estimating the one or more channel availability parameter values comprises: receiving, from one or more additional UEs, channel availability report messages comprising channel availability parameter values; aggregating the received channel availability parameter values; and determining the one or more channel availability parameter values based at least in part on the aggregating.

Aspect 11: A method for wireless communications at a second UE, comprising: receiving control signaling comprising an indication of a co-channel configuration indicating a set of sidelink parameters for co-channel operation dynamically utilizing sidelink radio frequency resources allocated for a first radio access technology and sidelink radio frequency resources allocated for a second radio access technology according to the co-channel operations; receiving a report message from a first UE, the report message comprising an indication of a set of channel availability parameter values indicating an amount of available sidelink radio frequency resources associated with the first radio access technology, the second radio access technology, or both; selecting a pattern of sidelink resources associated with the first radio access technology based at least in part on a co-channel configuration and the estimated one or more channel availability parameter values; and transmitting, to the first UE, an indication of the pattern of sidelink resources associated with the one or more channel availability parameter values for communication by the first UE according to the pattern of sidelink resources.

Aspect 12: The method of aspect 11, further comprising: identifying, in the co-channel configuration, an indication of a relationship between a set of channel availability parameter values and a set of patterns of sidelink resources, wherein each pattern of sidelink resources of the set of patterns of sidelink resources is associated with at least one channel availability parameter value.

Aspect 13: The method of aspect 12, further comprising: mapping the estimated one or more channel availability parameter values to the set of channel availability parameter values; identifying the pattern of sidelink resources from the set of patterns of sidelink resources that is associated with the one or more channel availability parameter values based at least in part on the mapping; and selecting the pattern of sidelink resources based at least in part on identifying the pattern of sidelink resources from the set of patterns of sidelink resources.

Aspect 14: The method of any of aspects 12 through 13, wherein the indication of the relationship comprises a lookup table.

Aspect 15: The method of any of aspects 12 through 14, wherein the channel availability parameter value comprises an indication of quality of service, a priority level, a channel busy ratio, a penetration rate associated with the first radio access technology, the second radio access technology, or both, or any combination thereof.

Aspect 16: The method of any of aspects 11 through 15, wherein receiving the report message comprises: receiving, on a sidelink control channel or sidelink shared channel, a set of MAC control elements (CEs), each MAC-CE associated with one of the set of channel availability parameter values, wherein each of the channel availability parameter values is associated with a respective UE of a set of UEs comprising the set of UEs.

Aspect 17: The method of any of aspects 11 through 16, wherein receiving the report message comprises: receiving, on a sidelink control channel or sidelink shared channel, a MAC control element (CE) comprising a set of fields, wherein each field of the set of fields comprises an indication of a channel availability parameter value of the set of channel availability parameter values, wherein each of the channel availability parameter values is associated with a respective UE of a set of UEs comprising the set of UEs.

Aspect 18: The method of any of aspects 11 through 17, further comprising: determining a set of component carriers supporting the co-channel operations based at least in part on at least one sidelink parameter of the set of sidelink parameters, wherein the set of component carriers includes one or more of a first subset of component carriers associated with the first radio access technology indicated as shareable or un-sharable with the second radio access technology.

Aspect 19: The method of any of aspects 11 through 18, further comprising: determining a set of sidelink resource pools based at least in part on the determined set of component carriers, wherein the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology Aspect 20: An apparatus for wireless communications at a first UE, comprising a processor; memory coupled with the processor; and instructions stored in the memory and executable by the processor to cause the apparatus to perform a method of any of aspects 1 through 10.

Aspect 21: An apparatus for wireless communications at a first UE, comprising at least one means for performing a method of any of aspects 1 through 10.

Aspect 22: A non-transitory computer-readable medium storing code for wireless communications at a first UE, the code comprising instructions executable by a processor to perform a method of any of aspects 1 through 10.

Aspect 23: An apparatus for wireless communications at a second UE, comprising a processor; memory coupled with the processor; and instructions stored in the memory and executable by the processor to cause the apparatus to perform a method of any of aspects 11 through 19.

Aspect 24: An apparatus for wireless communications at a second UE, comprising at least one means for performing a method of any of aspects 11 through 19.

Aspect 25: A non-transitory computer-readable medium storing code for wireless communications at a second UE, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving control signaling comprising an indication of a co-channel configuration indicating a set of sidelink parameters for co-channel operations dynamically utilizing sidelink radio frequency resources allocated for a first radio access technology and sidelink radio frequency resources allocated for a second radio access technology according to the co-channel operations;
   estimating one or more channel availability parameter values indicating an amount of available sidelink radio frequency resources associated with the first radio access technology, the second radio access technology, or both;
   selecting, from a set of sidelink resource patterns indicated in the co-channel configuration, a pattern of sidelink resources associated with the first radio access technology and the estimated one or more channel availability parameter values, wherein the pattern of sidelink resources includes one or more time intervals during which the first UE transmits packets associated with the second radio access technology via resources associated with the first radio access technology; and communicating on the sidelink radio frequency resources according to the selected pattern of sidelink resources.

2. The method of claim 1, further comprising:

identifying, in the co-channel configuration, an indication of a relationship between a set of channel availability parameter values and a set of patterns of sidelink resources, wherein each pattern of sidelink resources of the set of patterns of sidelink resources is associated with at least one channel availability parameter value.

3. The method of claim 2, further comprising:

mapping the estimated one or more channel availability parameter values to the set of channel availability parameter values;

identifying the pattern of sidelink resources from the set of patterns of sidelink resources that is associated with the estimated one or more channel availability parameter values based on the mapping; and selecting the pattern of sidelink resources based on identifying the pattern of sidelink resources from the set of patterns of sidelink resources.

4. The method of claim 2, wherein the indication of the relationship comprises a lookup table.

5. The method of claim 2, wherein the channel availability parameter value comprises an indication of quality of service, a priority level, a channel busy ratio, a penetration rate associated with the first radio access technology, the second radio access technology, or both, or any combination thereof.

6. The method of claim 5, wherein the penetration rate comprises an amount of UEs of a set of UEs operating according to the second radio access technology.

7. The method of claim 1, further comprising:

determining a set of component carriers supporting the co-channel operations based on at least one sidelink parameter of the set of sidelink parameters, wherein the set of component carriers includes one or more of a first subset of component carriers associated with the first radio access technology indicated as shareable or unsharable with the second radio access technology.

8. The method of claim 7, further comprising:

determining a set of sidelink resource pools based on the determined set of component carriers, wherein the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

9. The method of claim 1, wherein estimating the one or more channel availability parameter values comprises:

performing one or more measurements on radio frequency resources associated with the first radio access technology for co-channel operation; or detecting operations on radio frequency resources associated with the first radio access technology for the co-channel by devices using the first radio access technology, devices using the second radio access technology, or both.

10. The method of claim 1, wherein estimating the one or more channel availability parameter values comprises:

receiving, from one or more additional UEs, channel availability report messages comprising channel availability parameter values;

aggregating the received channel availability parameter values; and determining the one or more channel availability parameter values based on the aggregating.

11. A method for wireless communications at a second user equipment (UE), comprising:

receiving control signaling comprising an indication of a co-channel configuration indicating a set of sidelink parameters for co-channel operations dynamically utilizing sidelink radio frequency resources allocated for a first radio access technology and sidelink radio frequency resources allocated for a second radio access technology according to the co-channel operations;

receiving a report message from a first UE, the report message comprising an indication of a set of channel availability parameter values indicating an amount of available sidelink radio frequency resources associated with the first radio access technology, the second radio access technology, or both;

selecting a pattern of sidelink resources associated with the first radio access technology based on the co-channel configuration and one or more channel availability parameter values; and transmitting, to the first UE, an indication of the pattern of sidelink resources associated with the one or more channel availability parameter values for communication by the first UE according to the pattern of sidelink resources.

12. The method of claim 11, further comprising:

identifying, in the co-channel configuration, an indication of a relationship between a set of channel availability parameter values and a set of patterns of sidelink resources, wherein each pattern of sidelink resources of the set of patterns of sidelink resources is associated with at least one channel availability parameter value.

13. The method of claim 12, further comprising:

mapping the one or more channel availability parameter values to the set of channel availability parameter values;

identifying the pattern of sidelink resources from the set of patterns of sidelink resources that is associated with the one or more channel availability parameter values based on the mapping; and selecting the pattern of sidelink resources based on identifying the pattern of sidelink resources from the set of patterns of sidelink resources.

14. The method of claim 12, wherein the indication of the relationship comprises a lookup table.

15. The method of claim 12, wherein a channel availability parameter value comprises an indication of quality of service, a priority level, a channel busy ratio, a penetration rate associated with the first radio access technology, the second radio access technology, or both, or any combination thereof.

16. The method of claim 11, wherein receiving the report message comprises:

receiving, on a sidelink control channel or sidelink shared channel, a set of media access control (MAC) control elements (CEs), each MAC-CE associated with one of the set of channel availability parameter values, wherein each channel availability parameter value of the set of channel availability parameter values is associated with a respective UE of a set of UEs comprising the set of UEs.

17. The method of claim 11, wherein receiving the report message comprises:
  receiving, on a sidelink control channel or sidelink shared channel, a media access control (MAC) control element (CE) comprising a set of fields, wherein each field of the set of fields comprises an indication of a channel availability parameter value of the set of channel availability parameter values, wherein each of the channel availability parameter values is associated with a respective UE of a set of UEs comprising the set of UEs.

18. The method of claim 11, further comprising:
  determining a set of component carriers supporting the co-channel operations based on at least one sidelink parameter of the set of sidelink parameters, wherein the set of component carriers includes one or more of a first subset of component carriers associated with the first radio access technology indicated as shareable or unsharable with the second radio access technology.

19. The method of claim 18, further comprising:
  determining a set of sidelink resource pools based on the determined set of component carriers, wherein the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

20. An apparatus for wireless communications at a first user equipment (UE), comprising:
  a processor;
  memory coupled with the processor; and
  instructions stored in the memory and executable by the processor to cause the apparatus to:
    receive control signaling comprising an indication of a co-channel configuration indicating a set of sidelink parameters for co-channel operations dynamically utilizing sidelink radio frequency resources allocated for a first radio access technology and sidelink radio frequency resources allocated for a second radio access technology according to the co-channel operations;
    estimate one or more channel availability parameter values indicating an amount of available sidelink radio frequency resources associated with the first radio access technology, the second radio access technology, or both;
    select, from a set of sidelink resource patterns indicated in the co-channel configuration, a pattern of sidelink resources associated with the first radio access technology and the estimated one or more channel availability parameter values, wherein the pattern of sidelink resources includes one or more time intervals during which the first UE transmits packets associated with the second radio access technology via resources associated with the first radio access technology; and
    communicate on the set of sidelink resources according to the selected pattern of sidelink resources.

21. The apparatus of claim 20, wherein the instructions are further executable by the processor to cause the apparatus to:
  identify, in the co-channel configuration, an indication of a relationship between a set of channel availability parameter values and a set of patterns of sidelink resources, wherein each pattern of sidelink resources of the set of patterns of sidelink resources is associated with at least one channel availability parameter value.

22. The apparatus of claim 21, wherein the instructions are further executable by the processor to cause the apparatus to:
  map the estimated one or more channel availability parameter values to the set of channel availability parameter values;
  identify the pattern of sidelink resources from the set of patterns of sidelink resources that is associated with the estimated one or more channel availability parameter values based on the mapping; and
  select the pattern of sidelink resources based on identifying the pattern of sidelink resources from the set of patterns of sidelink resources.

23. The apparatus of claim 20, wherein the instructions are further executable by the processor to cause the apparatus to:
  determine a set of component carriers supporting the co-channel operations based on at least one sidelink parameter of the set of sidelink parameters, wherein the set of component carriers includes one or more of a first subset of component carriers associated with the first radio access technology indicated as shareable or unsharable with the second radio access technology.

24. The apparatus of claim 23, wherein the instructions are further executable by the processor to cause the apparatus to:
  determine a set of sidelink resource pools based on the determined set of component carriers, wherein the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

25. The apparatus of claim 20, wherein the instructions to estimate the one or more channel availability parameter values are executable by the processor to cause the apparatus to:
  perform one or more measurements on radio frequency resources associated with the first radio access technology for co-channel operation; or
  detect operations on radio frequency resources associated with the first radio access technology for the co-channel by devices using the first radio access technology, devices using the second radio access technology, or both.

26. The apparatus of claim 20, wherein the instructions to estimate the one or more channel availability parameter values are executable by the processor to cause the apparatus to:
  receive, from one or more additional UEs, channel availability report messages comprising channel availability parameter values;
  aggregate the received channel availability parameter values; and
  determine the one or more channel availability parameter values based on the aggregating.

27. An apparatus for wireless communications at a second user equipment (UE), comprising:
  a processor;

memory coupled with the processor; and instructions stored in the memory and executable by the processor to cause the apparatus to:
- receive control signaling comprising an indication of a co-channel configuration indicating a set of sidelink parameters for co-channel operations dynamically utilizing sidelink radio frequency resources allocated for a first radio access technology and sidelink radio frequency resources allocated for a second radio access technology according to the co-channel operations;
- receive a report message from a first UE, the report message comprising an indication of a set of channel availability parameter values indicating an amount of available sidelink radio frequency resources associated with the first radio access technology, the second radio access technology, or both;
- select a pattern of sidelink resources associated with the first radio access technology based on a co-channel configuration and one or more channel availability parameter values; and
- transmit, to the first UE, an indication of the pattern of sidelink resources associated with the one or more channel availability parameter values for communication by the first UE according to the pattern of sidelink resources.

28. The apparatus of claim 27, wherein the instructions are further executable by the processor to cause the apparatus to:
- identify, in the co-channel configuration, an indication of a relationship between the set of channel availability parameter values and a set of patterns of sidelink resources, wherein each pattern of sidelink resources of the set of patterns of sidelink resources is associated with at least one channel availability parameter value.

29. The apparatus of claim 28, wherein the instructions are further executable by the processor to cause the apparatus to:
- map the one or more channel availability parameter values to the set of channel availability parameter values;
- identify the pattern of sidelink resources from the set of patterns of sidelink resources that is associated with the one or more channel availability parameter values based on the mapping; and
- select the pattern of sidelink resources based on identifying the pattern of sidelink resources from the set of patterns of sidelink resources.

30. The apparatus of claim 27, wherein the instructions to receive the report message are executable by the processor to cause the apparatus to:
- receive, on a sidelink control channel or sidelink shared channel, a media access control (MAC) control element (CE) comprising a set of fields, wherein each field of the set of fields comprises an indication of a channel availability parameter value of the set of channel availability parameter values, wherein each of the channel availability parameter values is associated with a respective UE of a set of UEs comprising the set of UEs.

* * * * *